US010427988B2

(12) United States Patent
Charreyre

(10) Patent No.: US 10,427,988 B2
(45) Date of Patent: Oct. 1, 2019

(54) METHOD AND INSTALLATION FOR TREATING A WASTE MIXTURE, INCLUDING SEPARATION AND COMPOSTING OF SAID MIXTURE

(71) Applicant: Finance Développement Environnement Charreyre—FIDEC, Polignac (FR)

(72) Inventor: Fabien Michel Alain Charreyre, Allegre (FR)

(73) Assignee: FINANCE DEVELOPMENT ENVIRONNEMENT CHARREYRE—FIDEC, Polignac (FR)

(*) Notice: Subject to any disclaimer, the term of this patent is extended or adjusted under 35 U.S.C. 154(b) by 0 days.

(21) Appl. No.: 15/313,425

(22) PCT Filed: May 22, 2015

(86) PCT No.: PCT/FR2015/051370
§ 371 (c)(1),
(2) Date: Nov. 22, 2016

(87) PCT Pub. No.: WO2015/177485
PCT Pub. Date: Nov. 26, 2015

(65) Prior Publication Data
US 2017/0158574 A1 Jun. 8, 2017

(30) Foreign Application Priority Data
May 23, 2014 (FR) ...................................... 14 54708

(51) Int. Cl.
*C05F 17/00* (2006.01)
*C05F 17/02* (2006.01)
(Continued)

(52) U.S. Cl.
CPC ........... *C05F 17/0258* (2013.01); *B03B 9/06* (2013.01); *B03C 1/23* (2013.01); *B07B 1/18* (2013.01);
(Continued)

(58) Field of Classification Search
None
See application file for complete search history.

(56) References Cited

U.S. PATENT DOCUMENTS 5,071,075 A   12/1991  Wiens
5,250,100 A * 10/1993  Armbristor ............... B03B 9/06
                                                     71/14
(Continued)

FOREIGN PATENT DOCUMENTS

DE   3916866 A1   11/1990
FR   2988625 A1   10/2013
(Continued)

*Primary Examiner* — Wayne A Langel
(74) *Attorney, Agent, or Firm* — Nath, Goldberg & Meyer; Joshua B. Goldberg

(57) ABSTRACT

The invention concerns a method for treating a mixture of wastes (2), the latter being with heterogeneous sizes, shapes and consistencies, the treatment method being characterized in that it includes the following successive steps:

Step E1 during which the mixture of wastes (2) is separated into a first fraction of wastes (13) the size of which is smaller than about 180 mm, preferably smaller than 140 mm, via a first series of separation orifices (7, 8) and into a residual second fraction of wastes (14), said first series of separation orifices (7, 8) comprising primary orifices (7) and secondary orifices (8) the size of which is larger than the size of the primary orifices (7) so that the mixture of wastes (2) is first brought into contact with the secondary orifices and then with the primary orifices (7), (Continued)

Step E2 during which the first fraction of wastes (13) is subjected to a composting process so as to compost, at least partially, the contained biodegradable wastes.
Wastes sorting.

21 Claims, 6 Drawing Sheets

(51) Int. Cl.
    *B07B 1/18*     (2006.01)
    *B07B 1/24*     (2006.01)
    *B07B 1/46*     (2006.01)
    *B07B 13/16*     (2006.01)
    *B03B 9/06*     (2006.01)
    *B09B 3/00*     (2006.01)
    *B03C 1/23*     (2006.01)
    *C05F 9/00*     (2006.01)

(52) U.S. Cl.
    CPC ............... *B07B 1/24* (2013.01); *B07B 1/469* (2013.01); *B07B 13/16* (2013.01); *B09B 3/00* (2013.01); *C05F 9/00* (2013.01); *C05F 17/00* (2013.01); *C05F 17/0027* (2013.01); *C05F 17/0045* (2013.01); *C05F 17/0276* (2013.01); *Y02A 40/214* (2018.01); *Y02P 20/145* (2015.11); *Y02W 30/43* (2015.05); *Y02W 30/523* (2015.05)

(56) References Cited

U.S. PATENT DOCUMENTS

| | | | | |
|---|---|---|---|---|
| 6,093,323 | A * | 7/2000 | Hofmann | B03B 9/06 210/631 |
| 8,809,038 | B1 * | 8/2014 | Choate | C05F 17/0027 435/262 |
| 2002/0082308 | A1 * | 6/2002 | Yamaguchi | C05F 9/00 516/9 |
| 2008/0020456 | A1 * | 1/2008 | Choate | B09B 3/00 435/290.4 |
| 2008/0310921 | A1 * | 12/2008 | Cerroni | B03B 9/06 405/129.2 |
| 2009/0199608 | A1 * | 8/2009 | Genois | B01D 53/85 71/9 |
| 2015/0135785 | A1 * | 5/2015 | Wang | B07B 9/00 71/9 |

FOREIGN PATENT DOCUMENTS

| | | |
|---|---|---|
| GB | 2474362 A | 4/2011 |
| WO | 2007098610 A1 | 9/2007 |

\* cited by examiner

METHOD AND INSTALLATION FOR TREATING A WASTE MIXTURE, INCLUDING SEPARATION AND COMPOSTING OF SAID MIXTURE

This is a National Phase Application filed under 35 U.S.C. 371 as a national stage of PCT/FR2015/051370, filed May 22, 2015, an application claiming the benefit of French Application No. 1454708, filed May 23, 2014, the content of each of which is hereby incorporated by reference in its entirety.

TECHNICAL FIELD

The present invention concerns the field of wastes treatment, in particular the treatment of domestic wastes and wastes of economic activities in order to recycle them, valorize them, or re-treat them.

More specifically, the invention concerns a method for treating a mixture of wastes, the latter being with heterogeneous sizes, shapes and consistencies, a non-negligible portion of the mass of the mixture of wastes being formed by biodegradable wastes, for example at least 10% of the mass, and a non-negligible portion of the mass of the mixture being formed by non-biodegradable recyclable wastes, for example at least 10% of the mass.

The invention also concerns a plant for treating a mixture of wastes, the latter being with heterogeneous sizes, shapes and consistencies, a non-negligible portion of the mass of the mixture of wastes being formed by biodegradable wastes, for example at least 10% of the mass, and a non-negligible portion of the mass of the mixture being formed by non-biodegradable recyclable wastes, for example at least 10% of the mass.

PRIOR ART

Conventionally, recycling of wastes in an industrial scale requires a preliminary sorting of the latter, in order to allow separating said wastes by types and to enable the recycling of the latter in separate and specialized recycling chains. For example, these chains are specialized in recycling metals, glass, papers and cardboards, in composting biodegradable wastes, or in the production of refuse-derived fuel. The complex wastes, and the other wastes which do not meet the criteria allowing them to be treated in the aforementioned chains are generally incinerated or buried, which is particularly harmful to the environment, and likely to pollute the air and the soils.

It is known to ask households generating the domestic wastes to sort, or at least pre-sort, their domestic wastes by themselves. Henceforth, it is necessary to organize a selective collection of the wastes intended to be composted, to be recycled, and the other wastes apparently unrecoverable, and therefore intended to be incinerated or to be buried. However, despite the progressive awareness of the households about sorting and its beneficial consequences on the environment, most of the time, such a sorting or pre-sorting cannot be considered to be reliable. Indeed, the households or the communes may be unable to sort the wastes in a proper way, which requires in particular adapted infrastructures (several bins for collecting wastes, the organization of a selective collection), sometimes expensive, bulky, and generating an additional traffic. Furthermore, the households may be unable to perform sorting in a correct way, for example by ignoring the exact nature of the wastes or the possibilities of valorizing the latter, or still by lack of willingness to perform the sorting.

Thus, a non-negligible amount of wastes are generally buried or incinerated, whereas they could have undergone a composting, a recycling, or a transformation into a refuse-derived fuel. For example, in practice, at most 20% of the mass of domestic wastes is generally recycled. In addition, it is generally necessary to sort again the wastes which have been sorted beforehand by the households before being able to perform the recycling, since numerous errors at sorting have contributed to the pollution of this mixture of pre-sorted wastes which to date cannot be treated otherwise than by burial or incineration. This additional sorting operation represents an additional cost and a non-negligible loss of time.

DISCLOSURE OF THE INVENTION

Consequently, the objects assigned to the present invention aim to remedy to the different drawbacks enumerated hereinbefore and to propose a new method and a new plant for treating a mixture of wastes allowing valorizing a very considerable portion of the mixture of wastes.

Another object of the invention aims to propose a new method and a new plant for treating a mixture of wastes allowing valorizing selectively one or several portion(s) of the mixture of wastes despite the heterogeneity of said mixture of wastes.

Another object of the invention aims to propose a new method and a new plant for treating a mixture of wastes which are versatile and universal, allowing treating any type of wastes.

Another object of the invention aims to propose a new method and a new plant for treating a mixture of wastes allowing generating products the value of which is quite higher than the initial value of the mixture of wastes.

Another object of the invention aims to propose a new method and a new plant for treating a mixture of wastes which are inexpensive and easy to implement.

Another object of the invention aims to propose a new method and a new plant for treating a mixture of wastes allowing reducing the number of infrastructures for collecting and treating wastes of communes.

Another object of the invention aims to propose a new method and a new plant for treating a mixture of wastes allowing simplifying the organization of collection of wastes by communes, businesses and households.

Another object of the invention aims to propose a new method and a new plant for treating a mixture of wastes allowing a treatment of the mixture of wastes in an almost, still fully, automated way.

Another object of the invention aims to propose a new method and a new plant for treating a mixture of wastes allowing sorting a mixture of wastes in an industrial scale.

The objects assigned to the invention are achieved by means of a method for treating a mixture of wastes, the latter being with heterogeneous sizes, shapes and consistencies, a non-negligible portion of the mass of the mixture of wastes being formed by biodegradable wastes, for example at least 10% of the mass, and a non-negligible portion of the mass of the mixture being formed by non-biodegradable recyclable wastes, for example at least 10% of the mass, the treatment method being characterized in that it includes the following successive steps:

Step E1 during which the mixture of wastes is separated into a first fraction of wastes the size of which is smaller than about 180 mm, preferably smaller than 140 mm, via a first series of separation orifices and into a residual second fraction of wastes, said first series of separation orifices comprising primary orifices and secondary orifices the size of which is larger than the size of the primary orifices so that the mixture of wastes is first brought into contact with the secondary orifices and then with the primary orifices, Step E2 during which the first fraction of wastes is subjected to a composting process so as to compost, at least partially, the contained biodegradable wastes.

The objects assigned to the invention are also achieved by means of a plant for treating a mixture of wastes, the latter being with heterogeneous sizes, shapes and consistencies, a non-negligible portion of the mass of the mixture of wastes being formed by biodegradable wastes, for example at least 10% of the mass, and a non-negligible portion of the mass of the mixture being formed by non-biodegradable recyclable wastes, for example at least 10% of the mass, the treatment plant being characterized in that it comprises:

a sorting machine, allowing separating the mixture of wastes into a first fraction of wastes the size of which is smaller than about 180 mm, preferably smaller than 140 mm, via a first series of separation orifices, said first series of separation orifices comprising primary orifices and secondary orifices the size of which is larger than the size of the primary orifices so that the mixture of wastes is first brought into contact with the secondary orifices and then with the primary orifices, and into a residual second fraction of wastes, a composting plant allowing subjecting the first fraction of wastes to a composting process so as to compost, at least partially, the contained biodegradable wastes.

BRIEF DESCRIPTION OF THE DRAWINGS

Other particularities and advantages of the invention will appear and will come out in more detail upon reading the description made hereinafter, with reference to the appended drawings, given only as an illustrative and non-limiting example, in which.

BEST WAY TO REALIZE THE INVENTION

Figure 1:
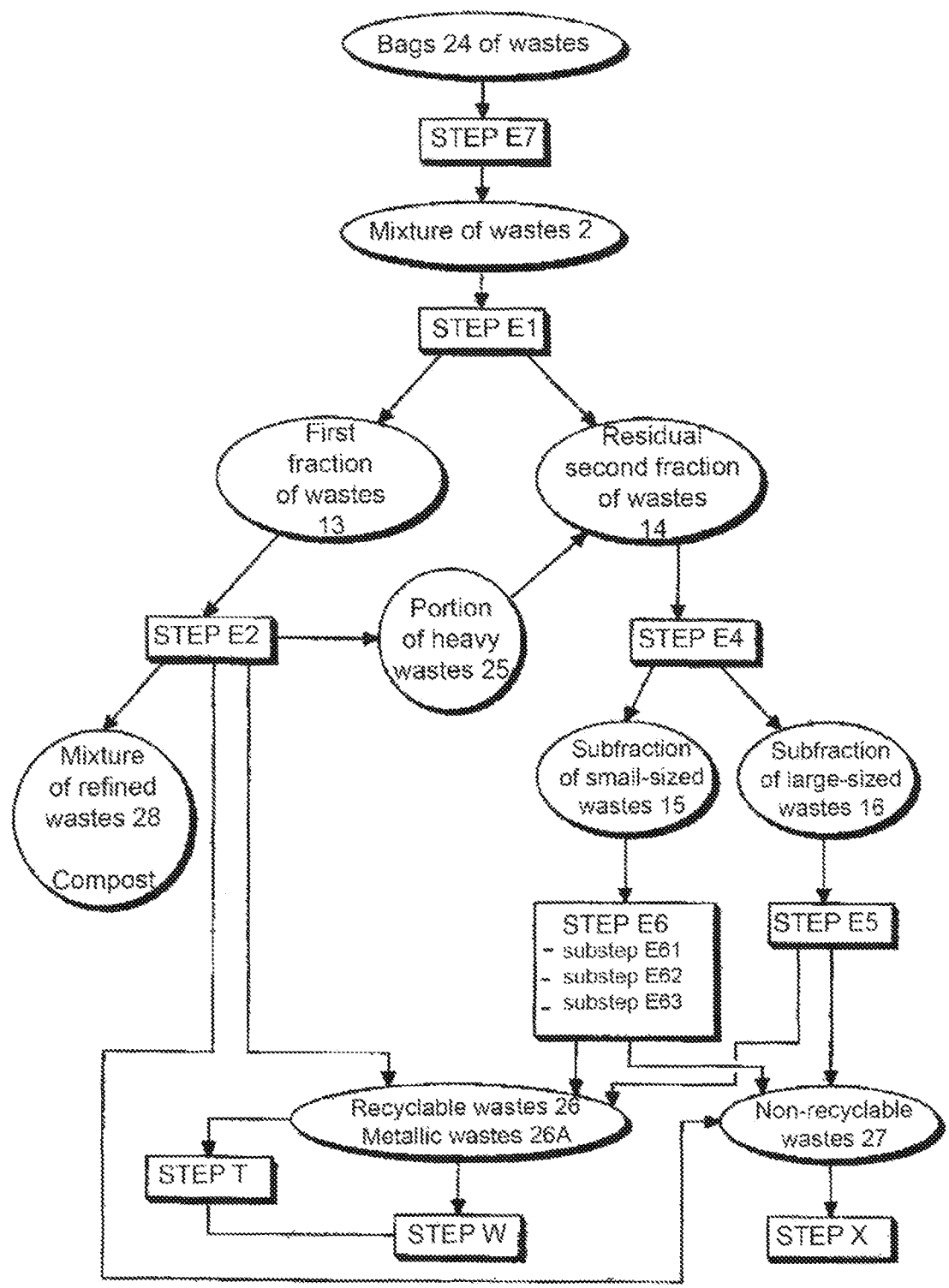
FIG. 1 represents, through a flow chart, a method for treating a mixture of wastes according to the invention, detailing the order of the steps of said method, in particular the separation step E1 and the composting step E2.

The invention concerns, as such, a method for treating a mixture of wastes 2, with the aim of refining, valorizing and/or recycling all or part of the wastes of the latter, and in particular the contained biodegradable wastes, recyclable wastes, and combustible wastes.

Preferably, the mixture of wastes 2 is formed by domestic wastes, but it may be also formed by wastes of economic or industrial activities, or by both, said wastes not having undergone any prior sorting, or grinding.

Thus, this mixture of wastes 2 is advantageously formed by wastes generated by households, by their consumption and by their daily life.

Preferably, the mixture of wastes 2 has not undergone any treatment and forms a raw mixture of wastes 2. In particular, the raw mixture of wastes has not undergone any grinding, nor does it have undergone any prior sorting aiming to perform a segregation of one type of wastes from another, and in particular to perform a separation of the biodegradable wastes and of the non-biodegradable recyclable wastes. Preferably, the mixture of wastes 2 has been collected, for example by means of garbage trucks, from households and/or economic activities without said households and/or said economic activities having performed any sorting or prior selection of the collected wastes. In particular, the collection of the mixture of wastes 2 has not been selective. Thus, according to a particularly interesting variant of the invention, the method of the invention is a method for treating a raw mixture of non-ground wastes.

Of course, without departing from the scope of the invention, the mixture of wastes 2 may have been deprived, on the contrary, from a portion of the contained recyclable wastes, for example by the households during a preliminary sorting, or it may have undergone a preliminary sorting, for example by the households.

Advantageously, the wastes of the mixture of wastes 2 are collected in a raw and undifferentiated way, mixed in bags, such as plastic trash bags closed by the households. Advantageously, prior to step E1 (described hereinafter), the method comprises a step E7 of opening bags 24, such as plastic trash bags, in which bags 24 the mixture of wastes 2 is contained, in order to release said mixture of wastes 2 from said bags 24 so as to perform step E1. This bags opening step is automated so as to involve no manual treatment.

Preferably, the mixture of wastes 2, thus released from the bags 24, is regrouped so as to form the mixture of wastes 2 implemented in the treatment method. For example, opening of the bags 24 of wastes may be performed by means of a device for opening bags, so as to enable the release of the wastes out of said bags 24, preferably without damaging or altering said wastes.

In particular, because of the absence of any preliminary sorting before the entry of the mixture of wastes 2 in the treatment method of the invention, the wastes present heterogeneous sizes, shapes and consistencies, preferably with various natures and origins. In particular, the considered mixture of wastes 2 may comprise, at the same time, soft, hard, sharp, liquid, powdery, solid, flat, hollow, full, sticky, slippery, fat, breakable, flexible, compressible, incompressible, combustible, incombustible wastes, or still wastes cumulating several of these characteristics. The mixture of wastes 2 contains a major portion of used and undesirable elements, for example food wastes, newspapers, papers, cardboards, glass, plastic, metal, textiles, various combustibles and incombustibles, complex materials, households hazardous wastes, inert wastes, bulky wastes.

According to the invention, a non-negligible portion of the mass of the mixture of wastes 2 is formed by biodegradable wastes, for example at least 10% of the mass, and a non-negligible portion of the mass of the mixture is formed by non-biodegradable recyclable wastes 26, for example at least 10% of the mass.

Advantageously, at least 10%, preferably at least 20%, of the mass of the mixture of wastes 2 is formed by biodegradable wastes, and at least 10%, preferably at least 20%, of the mass of the mixture is formed by non-biodegradable recyclable wastes 26.

By «biodegradable waste», is meant, in the context of the invention, a waste which, under the action of a natural environment, comprising for example living organisms and/or air and/or water, can be decomposed, naturally and spontaneously, into various elements likely to cause damages to the natural environment (high demand for oxygen, emission of leachates) unless being stabilized for example by composting. In particular, the living organisms may be formed by micro-organisms such as bacteria, funguses or algae, which are likely to degrade the biodegradable wastes through biochemical reactions. Preferably, by «biodegradable wastes», are meant wastes which can be degraded in this manner within a human lifetime scale, in a decade, or more preferably in one year or in a few months, preferably in a few weeks. Preferably, by «biodegradable wastes», are meant wastes which are likely to be used in the production and the formation of a compost by composting the latter.

The «non-biodegradable» wastes, in the context of the invention, constitute the other wastes, which do not undergo, spontaneously and naturally, such a degradation, or which undergo such a degradation in a too slow way. In particular, the «non-biodegradable» wastes are not adapted to enter into the formation of a compost by composting the latter.

A «recyclable» waste, in the context of the invention, forms a waste which may be easily transformed, for example chemically or mechanically, so as to form a recycled matter similar to a raw material, which may be used for example in the manufacture of an object. Preferably, the term «recyclable waste» excludes the biodegradable wastes, even though in practice their transformation into a compost confers a recyclable character to them. In the context of the invention, the recyclable wastes may comprise for example:

non-metallic wastes, in particular polymers, glass, papers, cardboard, newspapers, gravels, wood, textiles, electronics, etc.

metallic wastes, formed by any type of metals.

In the context of the invention, the term «non-recyclable wastes» refers to any waste which does not fall in any of the categories described hereinabove of «recyclable wastes» and «biodegradable wastes». In particular, the non-recyclable wastes regroup in particular wastes presenting a calorific value which makes them likely to be transformed into refuse-derived fuels, and other unusable ultimate wastes (complex wastes, etc.) intended for example to be buried or incinerated.

Advantageously, the method is an industrial method in which the steps are performed in an industrial scale and in parallel to each other. For example, while some wastes are undergoing a given step, other wastes simultaneously undergo another step.

Figure 2:
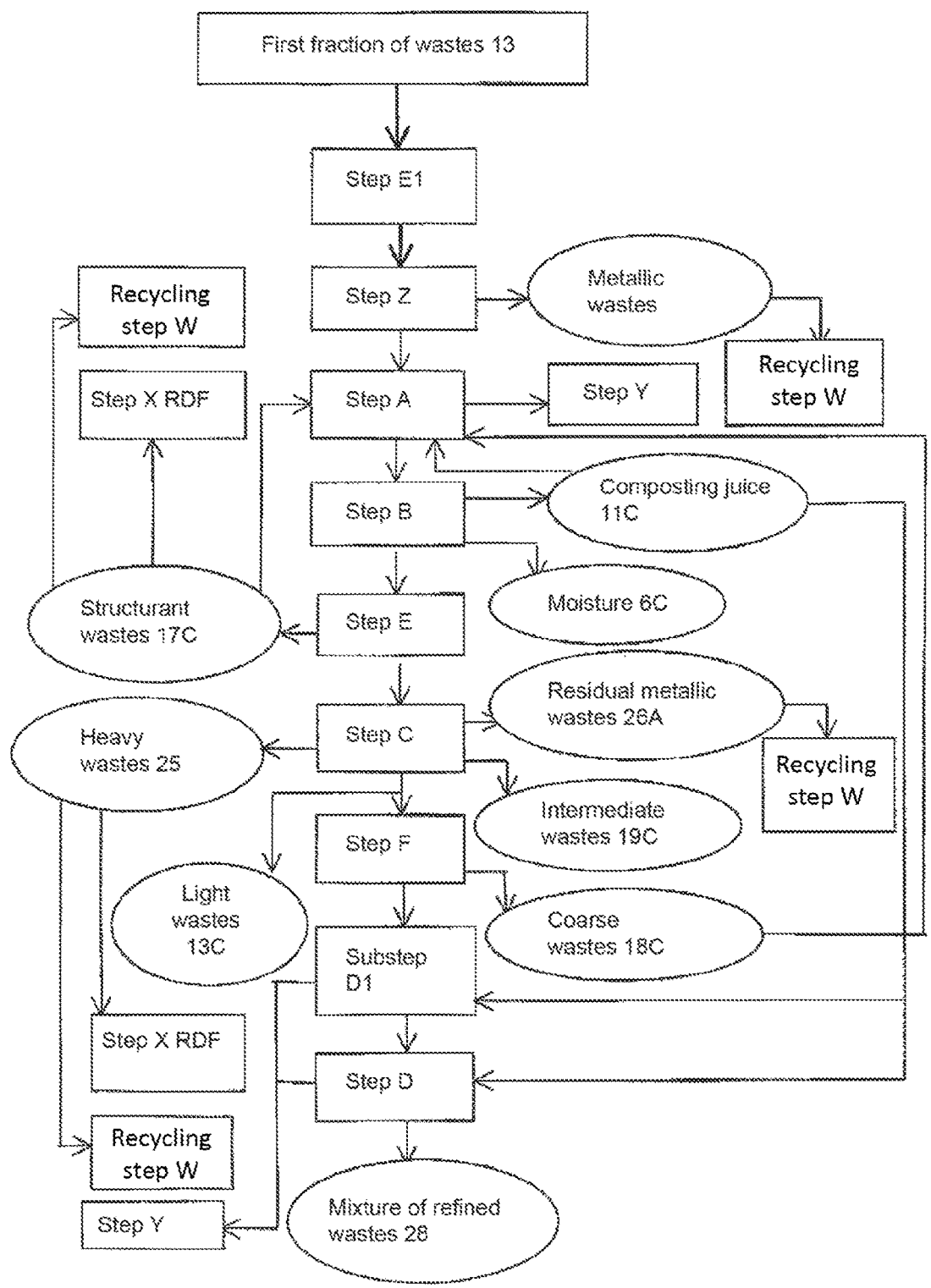
FIG. 2 represents in more detail, through a flow chart, the progress of the composting step E2 of the method of FIG. 1.

As illustrated in FIGS. 1 and 2, the treatment method of the invention includes a step E1 during which the mixture of wastes 2 is separated into a first fraction of wastes 13 the size of which is smaller than about 180 mm, preferably smaller than 140 mm, and a residual second fraction of wastes 14.

By «size», is meant, in a general manner, a spatial dimension of the waste along its largest length, or a characteristic dimension. By «size» of a waste, is meant a geometric dimension characteristic of an individual waste, which allows it, for example, to pass throughout a mesh with a corresponding size if the size of the waste is smaller than the size of the mesh, or, on the contrary, prevents it from passing if the size of said waste is larger than the size of said mesh.

By «residual second portion of wastes», is meant the remaining portion of wastes, which has not met the separation criteria of the first portion of wastes 13, in this instance the size criterion. However, in the context of the invention, there is nothing to prevent that wastes which would have met the separation criterion, in this instance the size criterion, of the first portion of wastes 13 could also exist in the residual second portion of wastes 14. For example, the residual second portion of wastes 14 may contain wastes the size of which is smaller than 50 mm.

In this manner, the first fraction of wastes 13 is advantageously formed by wastes presenting an average volumetric mass heavier than the wastes of the residual second fraction of wastes 14, to the extent that, in practice, the size of the wastes with the heaviest volumetric mass is preferably smaller than 180 mm.

Figure 4:
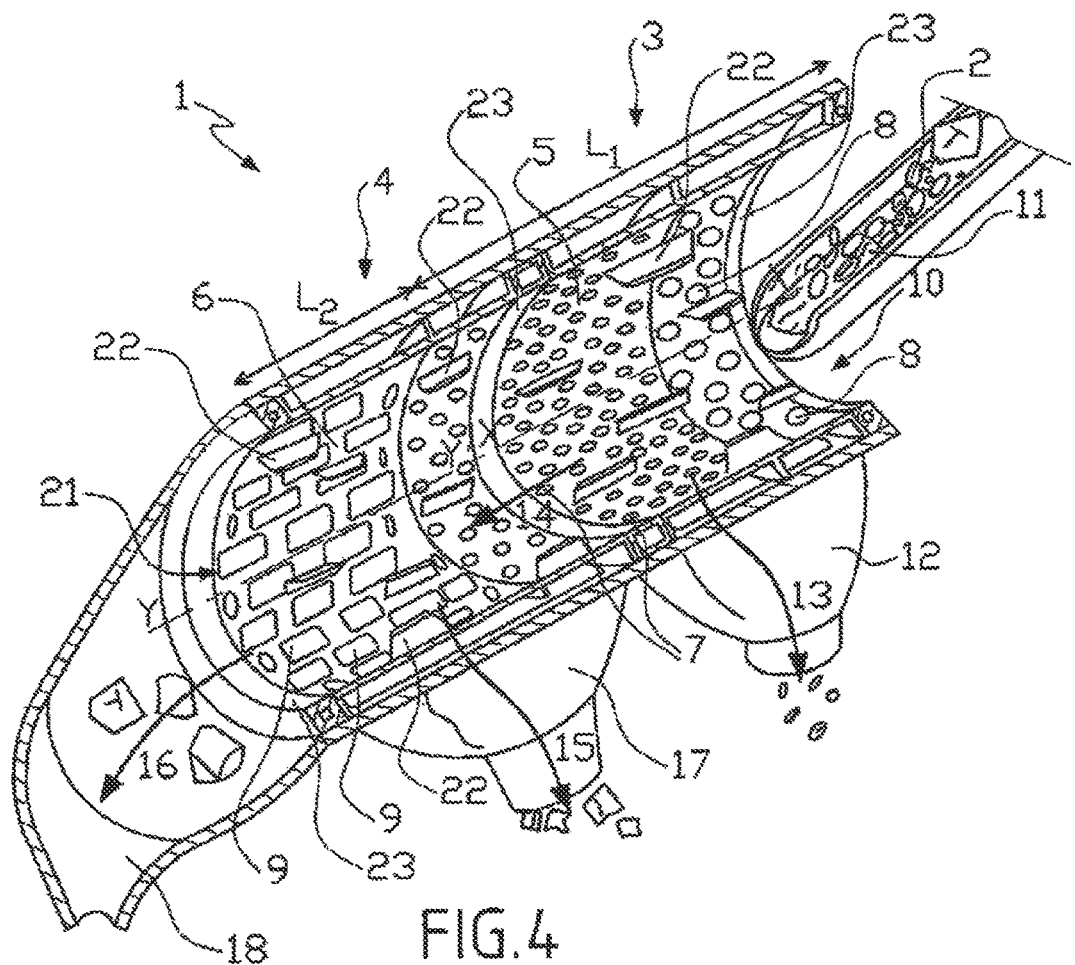
FIG. 4 represents, according to a schematic perspective view, a longitudinal section of a sorting machine which may be used to implement the treatment method of FIG. 1, in particular step E1, FIG. 4 showing in particular the inside of a first and second trommel sections of said sorting machine, including respectively a first separation wall and a second separation wall.
Figure 5:
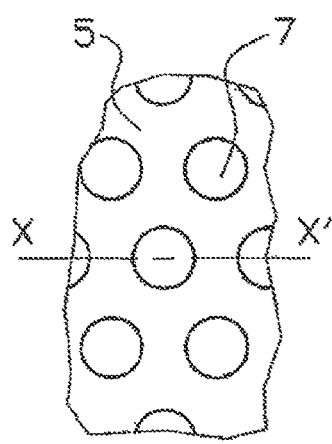
FIG. 5 represents, according to a schematic front view, a detail of the first separation wall of FIG. 4.
Figure 6:
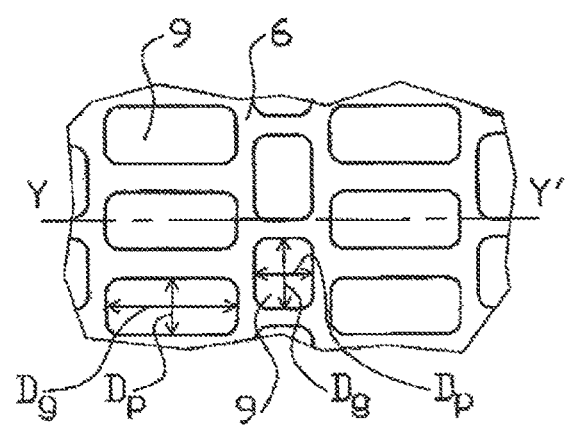
FIG. 6 illustrates, according to a schematic front view, a detail of the second separation wall of FIG. 4.

Advantageously, step E1 is performed by means of a sorting machine 1 described hereinafter, an embodiment of which is represented in FIGS. 4 to 6.

According to the invention, the step E1 of the method therefore includes a separation of the wastes the size of which is small enough, the volumetric mass of which is the heaviest, the dynamic inertia of which is the highest, the most sticky, fat, dirty and moist wastes of the mixture of wastes 2, so as to form the first fraction of wastes. Thus, the latter is advantageously formed at least by most of the wastes presenting such properties. Preferably, in this instance, the first fraction of wastes 13 therefore mostly concentrates organic and/or biodegradable wastes, which present the aforementioned properties most of the time. Thus, preferably, a non-negligible portion of the mass of the first fraction of wastes 13 is formed by biodegradable wastes, for example at least 50% of the mass of the first fraction of wastes 13, or still at least 60%, or still preferably at least 80%. Besides, a non-negligible portion of the mass of the residual second portion of wastes 14 is advantageously formed by non-biodegradable recyclable wastes, which may possibly be separated and recovered later on. Preferably, upon completion of step E1, the residual second fraction of wastes 14 contains a negligible proportion of biodegradable wastes.

Preferably, a non-negligible portion of the mass of the residual second fraction of wastes 14 is formed by recyclable wastes, for example at least 50% of the mass of the residual second fraction of wastes 14, or still at least 60%, or still preferably at least 80%. Besides, a non-negligible portion, but as reduced as possible, of the mass of the first fraction of wastes 13 is advantageously formed by biodegradable wastes, which may be separated and recovered later on in a simplified manner. Preferably, at this stage, less than 40% of the mass of the residual second fraction of wastes 14 is formed by biodegradable wastes, preferably less than 25%, or still less than 10%.

Upon completion of this first separation performed at step E1, the first fraction of wastes 13 and the residual second fraction of wastes 14 may be treated more easily in the following steps of the method, in particular to the extent that, at this stage, the wastes of the residual second fraction of wastes 14 are cleared from most of the organic and/or biodegradable, sticky, dirty and foul wastes.

Preferably, the wastes of the first fraction of wastes 13 have a size smaller than about 110 mm, and are separated by means of a sorting machine 1 including for example a rotary trommel, as described hereinafter.

Advantageously, the method includes, upon completion of step E1 and simultaneously with the latter, a step E4 of separating the residual second fraction of wastes 14 into a subfraction of large-sized wastes and a subfraction of small-sized wastes 15, the subfraction of large-sized wastes being formed by wastes the size of which is larger than the subfraction of small-sized wastes 15. Preferably, the subfraction of large-sized wastes is formed by wastes the size of which is larger than about 330 mm, the subfraction of small-sized wastes 15 being formed by wastes the size of which is smaller than about 330 mm. For example, step E4 may be performed by means of a sorting machine 1 described hereinafter, with a rotary trommel.

Thus, the fractions and subfractions of wastes 13, 15, 18 recovered separately may be treated independently, despite the very large heterogeneity of the initial mixture of wastes 2.

Advantageously:
- the first fraction of wastes 13 represents between 35 and 60% of the mass of the initial mixture of wastes 2, preferably about 42%,
- the subfraction of small-sized wastes 15 represents between 20 and 40% of the mass of the initial mixture of wastes 2, preferably about 28%,
- the subfraction of large-sized wastes 16 represents between 20 and 40% of the mass of the initial mixture of wastes 2, preferably about 30%.

Preferably, the treatment method includes a step E5 of manual sorting of the subfraction of large-sized wastes 16, allowing separating, on the one hand, the contained recyclable wastes 26 and, on the other hand, the contained non-recyclable wastes 27. Advantageously, the manual sorting is made possible at this stage, to the extent that the wastes are with a considerable size, devoid of small-sized wastes and of most fines. In addition, the wastes are advantageously devoid of most of the bonding and foul matter formed by the biodegradable matter, which makes the manual sorting possible. In particular, the manual sorting allows separating, from the subfraction of large-sized wastes 16, metallic wastes 26A, plastic wastes, large-sized electronic wastes, cardboard packages, etc.

The wastes recognized as recyclable wastes during the manual sorting are advantageously sent towards a recycling step W, as described hereinafter. The residual wastes which are not separated for recycling will advantageously be sent towards a refuse-derived fuel production step X, whether they are actually recyclable or non-recyclable.

Preferably, the treatment method includes a step E6 of automated sorting of the subfraction of small-sized wastes 15, allowing separating, on the one hand, the contained recyclable wastes 26 and, on the other hand, the contained non-recyclable wastes 27. Preferably, the subfraction of small-sized wastes 15 are adapted to an automatic sorting, the small-sized wastes 15 being too light to be manipulated for example by sorting apparatuses.

Preferably, step E6 includes a first substep E61 of separating the metallic wastes 26A contained in the subfraction of small-sized wastes 15, for example by means of an electromagnetic separator and/or an eddy current separator, so as to separate at least most of the metallic wastes 26A contained in said subfraction of small-sized wastes 15, the metallic wastes 26A forming at least most of the recyclable wastes 26. Thus, the metallic wastes 26A may advantageously be extracted from the subfraction of small-sized wastes 15, to the extent that said subfraction of small-sized 15 is preferably substantially devoid of sticky biodegradable wastes.

Preferably, step E6 includes a second substep E62 of separation of the subfraction of small-sized wastes 15 into a flow of substantially flat wastes and a flow of substantially volume-shaped wastes. In this manner, the two flows of wastes may be directed towards sorting machines adapted to the morphology of the contained wastes.

By «substantially flat wastes», are meant wastes extending in a generally flat fashion, such as for example newspapers, papers, various plates of plastic material. Advantageously, the term «substantially flat wastes» also encompasses volume-shaped wastes which are soft enough, or with a mechanical strength which is low enough to allow flattening or compacting them easily, for example some cardboard boxes.

By «substantially volume-shaped wastes», are meant wastes which extend in three dimensions in the space, which may be hollow, and which resist compaction more than substantially flat wastes, and which are more rigid, or more solid. As example, the substantially volume-shaped wastes may comprise plastic or glass bottles, plastic boxes, vials and various containers.

Preferably, this substep E62 is performed by means of a ballistic belt separator (not represented). Preferably, the ballistic belt presents an inclination with respect to the horizontal so as to form a slope, the rolling strip being designed to generate a forward motion in the ascent direction of the slope. Advantageously, the substantially volume-shaped wastes are intended to roll and rebound on the ballistic belt by gravity so as to descend the slope in the direction of a lower recovery means such as a bin or a conveyor, optionally integrating a glass trap. In turn, the substantially flat wastes are preferably driven upwards of the slope by the forward motion of the belt, towards an upper recovery means, for example another conveyor, so that the substantially flat wastes and the substantially volume-shaped wastes are separated.

Advantageously, the fine particles which are likely to be contained in the subfraction of small-sized wastes 15 adhere to the ballistic belt (the latter may possibly be humidified in order to amplify this effect), and may advantageously be scraped and recovered for example by means of a tungsten-made strip scraper mounted on said belt. Advantageously, the rolling strip of the ballistic belt may present elastic properties so as to enable the rebound of substantially volume-shaped wastes.

Preferably, the ballistic belt is combined with an accelerator belt mounted upstream, allowing accelerating the subfraction of small-sized wastes 15 so that the latter reach the ballistic belt of the ballistic belt separator with a predetermined speed.

Preferably, step E6 includes a third substep E63 of robotized sorting, on the one hand, of the flow of substantially flat wastes and, on the other hand, of the flow of substantially volume-shaped wastes, so as to separate each of said flows of recyclable wastes 26 and non-recyclable wastes, the third substep E63 being performed upon completion of the second substep E62. Advantageously, will be chosen sorting robots distinct and adapted respectively to sort, on the one hand, substantially flat wastes and, on the other hand, substantially volume-shaped wastes. Preferably, the sorting robots are designed to separate the recyclable wastes from the substantially flat wastes and from the substantially volume-shaped wastes by recognizing the latter, in particular by optical signature recognition, allowing in particular the sorting robot to detect the material of the waste to be sorted. Advantageously, the recyclable wastes recognized by the sorting robots will be sent towards a recycling step W. Advantageously, the non-recognized wastes, preferably including a small proportion of recyclable wastes and a major proportion of non-recyclable wastes, will be sent towards a refuse-derived fuel production step X.

After sorting by the sorting robots, before the recycling step W, the recyclable wastes may advantageously undergo a step T of the treatment method, during which non-ferrous metallic wastes are separated from the recyclable wastes, for example by means of an eddy current separator. At this stage of the method, the non-ferrous metallic wastes are formed for example by aluminum wastes, or still by food-grade flexible packages containing an aluminum sheet.

Advantageously, the distinct flows of substantially volume-shaped wastes and substantially flat wastes are conveyed by means of a set of conveyor belts to the sorting robots, the set of conveyor belts being designed to spread out and distribute the wastes so that almost no waste is superposed on top of another when said wastes arrive at the level of the sorting robots. Thus, the effectiveness of sorting by means of robots is advantageously improved.

Preferably, the substeps E61, E62 and E63 are performed successively in this order.

The treatment method of the invention also includes a step E2, performed successively to step E1, during which the first fraction of wastes 13 is subjected to a composting process so as to compost, at least partially, the contained biodegradable wastes.

Thus, step E2 preferably aims to valorize the first fraction of wastes 13, and in particular to convert the contained biodegradable wastes into a mixture of refined wasted 28, so that the mixture of refined wastes 28 preferably forms a compost complying with the standard NF U 44-051. The standard NF U 44-051 of 2006, named «Organic amendments—Denominations, specifications and markings», is a French standard.

Advantageously, the composting process of step E2 includes the following successive steps:
  Step A: the first fraction of wastes 13 is subjected to a first composting cycle so as to compost, at least partially, the biodegradable wastes of said first fraction of wastes 13, and to obtain a mixture of pre-composted wastes 2,
  Step B: the mixture of pre-composted wastes 2 is subjected to a drying so as to obtain a mixture of dried wastes 2,
  Step C: the mixture of dried wastes 2 is separated into at least one portion of heavy wastes 25 and one portion of light wastes 13C, the portion of heavy wastes 25 being formed by wastes with a volumetric mass heavier than the wastes of the portion of light wastes 13C,
  Step D: the portion of light wastes 13C is subjected to a second composting cycle so as to compost, at least partially, the contained biodegradable wastes, and to obtain a mixture of refined wastes 28, in particular a compost.

Advantageously, step E2 includes the treatment of the first fraction of wastes 13 by two successive composting cycles separated by a step of drying the first fraction of wastes 13 upon completion of the first composting cycle in order to facilitate the separation and the easier refining of the first fraction of wastes 13. Thus, even if the first fraction of wastes 13 is particularly heterogeneous and presents numerous undesirable wastes which are not likely to be treated by composting, it is possible to refine the latter through step E2 so as to obtain refined wastes 28 the value of which is higher than the value of the initial mixture of wastes.

By «composting», is meant, in the context of the invention, a biological process of conversion and valorization of the organic wastes, and in particular the biodegradable wastes contained in the first fraction of wastes 13, by promoting and/or accelerating the natural biodegradation process. Preferably, the composting cycles of step E2 allow converting at least a portion of the first fraction of wastes 13 into a stabilized product, hygienic, rich in humic compounds, preferably into a compost. By «composting», is meant a composting, for example traditional or industrial, implementing in particular the action of micro-organisms in order to degrade and putrefy wastes of the first fraction of wastes 13, these micro-organisms being naturally present in the first fraction of wastes 13 and/or added to the first fraction of wastes 13, and/or brought to multiply in the first fraction of wastes 13. In particular, the present composting involves an aeration of the first fraction of wastes 13, and/or a regulation of the humidity of the first fraction of wastes 13 (for example by adding water to the first fraction of wastes 13 and/or by reintroducing in the first fraction of wastes 13 composting juices 11 emitted by the latter), and/or an addition of micro-organisms to the first fraction of wastes 13 and/or an addition of structurants 17C in order to stimulate the composting process, and/or a supply of light, for example solar light.

Preferably, step A corresponds to, or comprises, a phase of degradation of the wastes, in particular the biodegradable wastes, whereas step C corresponds to, or comprises, a phase of maturation of the wastes, in particular the biodegradable wastes, so as to obtain the mixture of refined wastes 28, the latter advantageously forming the compost. The degradation phase is advantageously reflected by a proliferation of micro-organisms in the first fraction of wastes 13, whereas the maturation phase is preferably reflected by the progressive decrease of the amount of micro-organisms having proliferated during the degradation phase, and by the preservation of micro-organisms beneficial to the soils. The degradation and maturation phases may overlap each other, and even coincide with each other.

During step A, the first composting cycle advantageously allows composting the biodegradable portion of the first fraction of wastes 13, whereas the non-biodegradable wastes remains, of course, substantially unaltered, and serve in particular as structurants 17C to the composting process, the structurant wastes 17C being intended in particular to improve the air flow within the first fraction of wastes 13 during composting, so as to improve the aerobic composting.

Advantageously, both the first composting cycle of step A and the second composting cycle of step D are performed in an aerobic manner. For this purpose, the first fraction of wastes 13 to be composted is preferably aerated, in particular by making an air flow circulate throughout the first fraction of wastes 13 to be composted, or by stirring the first fraction of wastes 13.

Preferably, a light source 5C is brought to the first fraction of wastes 13 in order to improve its composting, for example a natural light source 5C, and/or an artificial light source 5C.

Figure 9:
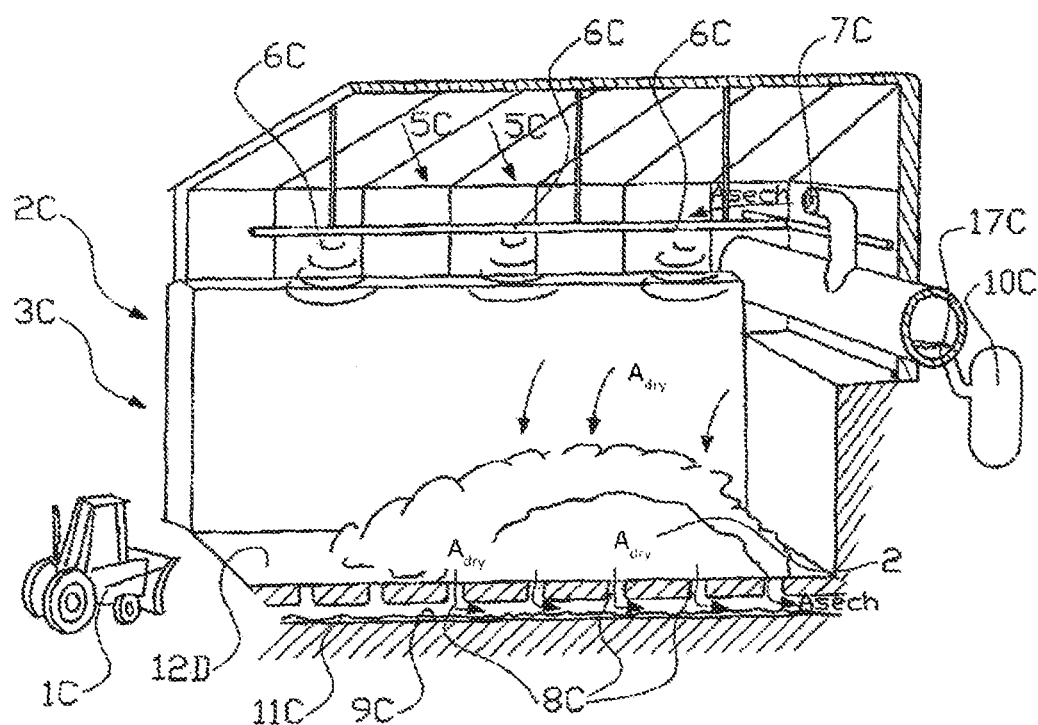
FIG. 9 illustrates, according to a perspective view, a longitudinal section of a drying/composting bay which may be used in the treatment method of FIG. 1, in particular during step E2.

Advantageously, during step A and/or step D and/or step B, the considered wastes being disposed in a heap which is turned over several times, for example by means of an adapted loader 10, in order to contribute to aerate the wastes (as illustrated for example in FIG. 9). Preferably, during step A, the first fraction of wastes 13 is disposed in at least one first composting bay 3C, for example in a heap. Still preferably, during step D, the wastes of the portion of light wastes 13C are disposed in at least one second composting bay 3C.

Preferably, during step A, and/or during step D, the considered wastes are humidified by means of humidity sources 6C, the humidity sources 6C being formed for example by sprinkling devices or sprinkling ramps equipping the first and/or second composting bays, the heaps being intended to be sprinkled over by the sprinkling devices, said sprinkling devices being for example disposed above said heaps.

Thus, a regulation of the humidity of the composting mixture is advantageously operated during the composting cycles.

Advantageously, step E2 includes a step Y during which composting juices 11 oozing from the mixture of wastes is recovered in order to supply the humidity sources 6C.

Preferably, step Y may also include capturing rainwater in order to supply the humidity sources 6C, which allows in particular reducing the possible consumption of tap water, in particular drinking water, of step E2.

Preferably, before step A, and in particular after step E1, the first fraction of wastes 13 contains a major proportion of moist and/or sticky wastes, formed in particular by biodegradable wastes, or at the very least adapted to be composted. Advantageously, their sticky and/or moist character facilitates their separation from the residual second fraction of wastes by the sorting machine.

Preferably, prior to step A, step E2 includes a step Z during which metallic wastes 26A contained in the first fraction of wastes 13 are separated, for example by means of an electromagnetic separator and/or an eddy current separator, so as to separate at least most of said metallic wastes 26A contained in the mixture of wastes 2. Thus, the first fraction of wastes 13 intended to the first composting cycle is devoid of most of the metallic wastes 26A which it contained, and in particular those the size and/or the mass of which is considerable, so that the composting process of the first composting cycle is promoted and accelerated. Advantageously, the metallic wastes 26A separated at step Z may undergo the recycling step W.

Preferably, step B, performed after step A for the considered first fraction of wastes 13, allows retrieving all or part of the moisture 6C of the mixture of wastes 2 pre-composted during said step A. As illustrated in FIG. 9, to do so, the mixture of pre-composted wastes 2, disposed for example in a heap on at least one, or still in several, drying bay(s), is subjected to drying. Preferably, step B comprises a substep B1 of making a drying air flow $A_{dry}$ circulate throughout said mixture of pre-composted wastes 2 in order to dry the latter, the drying air flow $A_{dry}$ passing, to this end, throughout the heap of wastes. Advantageously, the drying air $A_{dry}$ is formed by a dry air current heated to a temperature comprised between 40° C. and 90° C., preferably 70° C., and which is capable of driving, during its passage in the mixture of pre-composted wastes 2, the moisture 6C contained in the latter. Preferably, the circulation of the drying air flow $A_{dry}$ is performed vertically, preferably from top to the bottom, or still from bottom to the top. Thus, a suction of drying air 8C is advantageously generated below the heap of pre-composted wastes.

Preferably, in order to implement step B, the mixture of pre-composted wastes 2 is disposed in heaps in drying bays, for example at the ground level. In order to contribute to drying of said mixture of pre-composted wastes 2, step E2 includes turning the heap over once or several times.

Preferably, and in order to save natural resources, at least a portion of the moisture 6C contained in the mixture of pre-composted wastes 2 is recovered during step B, and the humidity sources 6C are supplied with the recovered portion of moisture 6C.

Preferably, the moisture 6C of the mixture of pre-composted wastes 2 is therefore retrieved from the latter during step B and then reintroduced afterwards in the portion of light wastes 13C at step D, so that this moisture is not wasted, and is reused, at least partially.

In particular, all or part of the composting juices 11C emanating from the mixture of pre-composted wastes 2 when drying is recovered, for example by draining the latter by means of a draining means 9C of the drying bay 2C. Advantageously, these composting juices 110 are stored, and transported in order to be reintroduced later on in the implementation of the first and second composting cycles. In particular, since the composting juices 110 include water, micro-organisms and other elements useful to the proper progress of a composting operation, their reintroduction via the humidity sources 6C in a mixture of wastes 2 to be composted allows improving the composting of the latter while reducing the need for an external supply of water, micro-organisms and other elements useful to the proper progress of the composting operation.

Advantageously, the drying air $A_{dry}$ is brought to circulate at least by an air blowing 7C performed above the mixture of pre-composted wastes 2, so that the drying air $A_{dry}$ drains the moisture 6C of the mixture of pre-composted wastes 2, the step of recovering the portion of moisture being performed, at least partially, by condensation of the moisture 6C coming from the mixture of pre-composted wastes 2 and drained by the flow of drying air $A_{dry}$.

Preferably, in this instance, each drying bay 2C also comprises means for circulating drying air $A_{dry}$ throughout the mixture of pre-composted wastes 2 so as to dry the latter, the circulation means including at least:

means for blowing air 7C above the mixture of pre-composted wastes 2, means for sucking drying air 8C below the mixture of pre-composted wastes 2.

In addition, each drying bay 2C advantageously comprises a recuperator 10C of a portion of the moisture 6C contained in the mixture of pre-composted wastes 2 when drying the latter, the moisture recuperator 10C allowing supplying the humidity sources 6C with the moisture 6C recovered when drying said pre-composted wastes.

Preferably, the flow of drying air $A_{dry}$ having circulated throughout the mixture of pre-composted wastes 2 is treated in order to clear it substantially from any composting emission, in particular any odorant emission, for example by filtering, or by a biochemical treatment. To this end, the drying bay(s) preferably comprise(s) means for treating the drying air $A_{dry}$ having circulated throughout the mixture of pre-composted wastes 2 in order to clear it substantially from any composting emission, in particular any odorant emission. In a general manner, the possible emissions of air and pollutants resulting from the implementation of step E2 are advantageously treated in this manner, which allows step E2 to be substantially non-polluting and to generate no odors.

Advantageously, upon completion of step B and prior to step C, said step E2 includes a step E during which a portion of wastes the size of which is larger than about 30 mm, called the structurant wastes 17C, whether they are biodegradable or not, composted or not, is separated from the mixture of dried wastes 2, and the concentration of structurant wastes 17C of other wastes undergoing step A is adjusted by adding the portion of structurant wastes 17C separated from the mixture of dried wastes 2, in particular in order to structure and scatter the first composting cycle. Advantageously, the separation of the structurant wastes 17C is performed by means of a rotary trommel the mesh of which allows segregating objects the size of which is larger than about 30 mm, and objects the size of which is smaller than about 30 mm. Thus, the structurant wastes 17C of the mixture of dried wastes 2 are advantageously reused in order to improve a current or subsequent first composting cycle of other wastes. In this manner, for the first composting cycle, it is not, or barely, necessary to add structurants 17C coming from an external source. Advantageously, a more or less large portion of the structurant wastes 17C recovered in wastes undergoing step A is reintroduced so as to adjust the concentration of structurants 17C of said wastes, by addition of a supplement, to a predetermined value, preferably allowing improving the first composting cycle. Preferably, the recovered structurant wastes 17C which have not been reintroduced may be sorted, for example manually or by means of a machine such as a rotary trommel, so as to separate recyclable wastes, to be recycled, and non-recyclable wastes, which undergo a refuse-derived fuel (RDF) production step X, or another type of re-treatment such as burial or incineration. Indeed, at this stage of step E2, it is possible to consider making a portion of the mixture of dried wastes 2 enter in the refuse-derived fuel production step X, to the extent that the wastes have been dried and are dry enough, and in particular with an intrinsic humidity lower than about 10%.

Advantageously, all or part of the elements undesirable in the formation of the final mixture of refined wastes 28 are separated during step C. This separation is facilitated by the fact that, at this stage of step E2, all or part of the biodegradable wastes have undergone the first composting cycle, so as to be composted, at least partially, and that these same biodegradable wastes are dry, and are therefore non-sticky, disseminated in the form of a powder or a gravel of a pre-compost which adheres, in a less significant manner, to the non-biodegradable wastes. Furthermore, these pre-composted and dry biodegradable wastes advantageously present, for most of them, a volumetric mass which is low and distinct from the rest of the wastes of the mixture of dried wastes 2. Thus, during step C, the portion of light wastes 13C comprises a major concentration of biodegradable wastes likely to be transformed into a compost. Thus, it is easy to perform a selection of the wastes likely to form the mixture of refined wastes 28 among the mixture of wastes 2, which was relatively heterogeneous at the beginning.

Preferably, step C and step E are carried out by means of means for separating the mixture of dried wastes 2 at least into a portion of heavy wastes 25 and a portion of light wastes 13C, the portion of heavy wastes 25 being substantially formed by wastes with a volumetric mass heavier than the wastes of the portion of light wastes 13C. Advantageously, the separation means also include the trommel associated to step E. Optionally, the trommel associated to step E may be equipped with a brush allowing cleaning the portion of light wastes 13C by friction, in order to separate the aforementioned wastes.

Preferably, the portion of light wastes 13C separated during step C presents a volumetric mass lower than about 0.7 kg/L, preferably lower than about 0.6 kg/L, the dry compost generally presenting a volumetric mass close to 0.5 kg/L. The plastic materials presenting a volumetric mass most often higher than 0.8 kg/L may therefore be separated easily from the portion of light wastes 13C. Thus, it is advantageously possible to separate, from the portion of light wastes 13C, the plastic materials, including the chlorinated plastic materials such as polyvinyl chlorides (PVC), so that the mixture of refined wastes 28 will be substantially free of these materials upon completion of step D, or will be provided with these materials in negligible proportions. For example, gravels and other stones, metals, glass, paper fibers, whether degraded or under degradation, may also be separated during step C, so that the mixture of refined wastes 28 will be substantially free of these materials upon completion of step D, or will be provided with these materials in negligible proportions.

Figure 3:
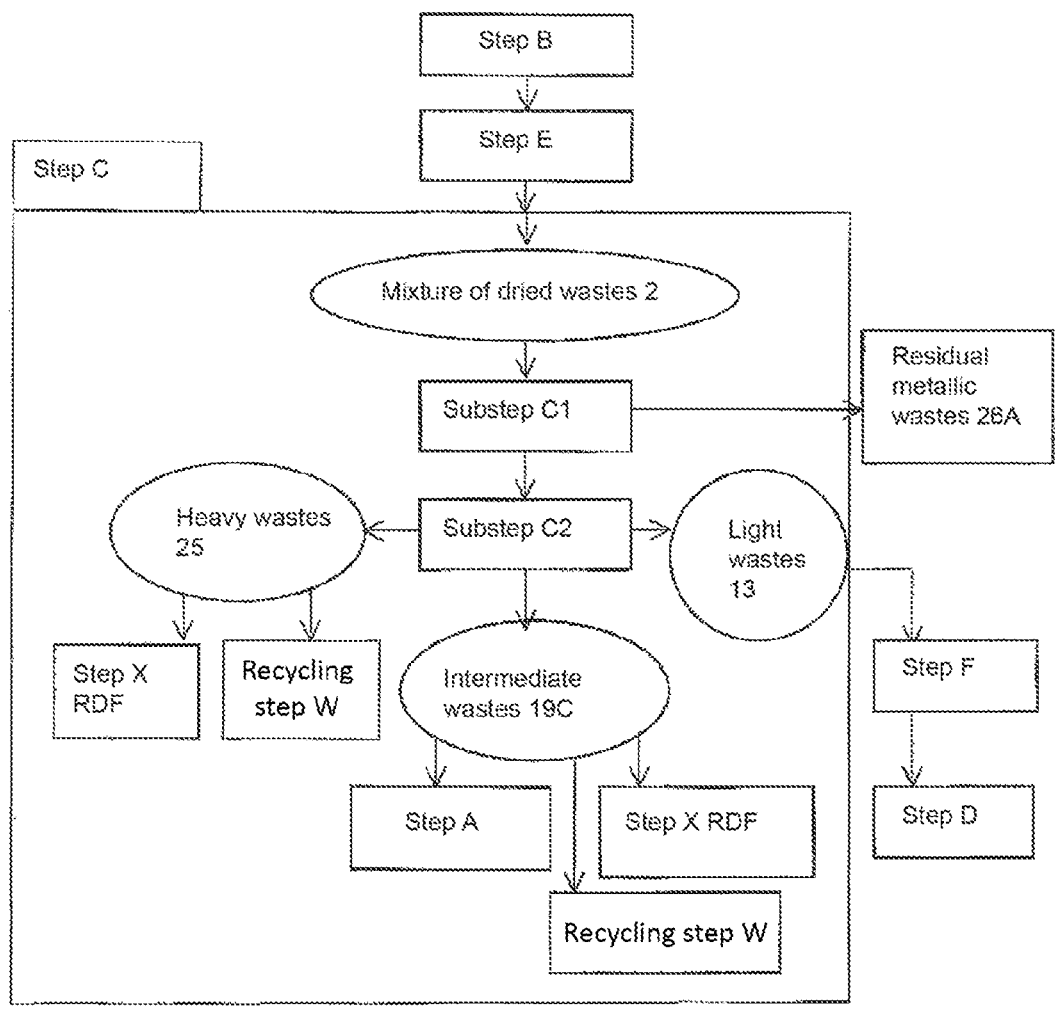
FIG. 3 represents in more detail, through a flow chart, the progress of a step C of step E2 of FIG. 2.

As illustrated in FIG. 3, step C preferably comprises a first substep C1 during which residual metallic wastes 26A are separated from the mixture of dried wastes 2, for example by means of an electromagnetic separator and/or an eddy current separator, so as to separate at least most of the residual metallic wastes 26A contained in said mixture of dried wastes 2. Thus, are advantageously separated again all the ferrous (by means of the magnetic separator) and non-ferrous (by means of the eddy current separator) metallic elements contained in the mixture of dried wastes 2, which would have not been separated in particular during step Z. Advantageously, the «dried» state of the wastes facilitated such a separation. Preferably, this first substep C1 contributes to the formation of a high-quality mixture of refined wastes 28, and in particular a compost complying with the standard NF U 44-051. Thus, step E2 preferably comprises a step W of recycling the metallic wastes 26A initially contained in the first fraction of wastes 13. Preferably, the substep C1 is performed before the separation of the heavy wastes and light wastes.

Preferably, besides the portion of heavy wastes 25 and light wastes 13C, step C comprises a second substep C2, during which, the mixture of dried wastes 2 is separated, into a portion of intermediate wastes 19C the volumetric mass of which is intermediate, that is to say comprised between the volumetric mass of the wastes of the first and second portions of wastes, and said portion of intermediate wastes 19C is added to the wastes undergoing step A. The intermediate wastes 19C, the volumetric mass of which is for example higher than about 0.6 kg/L but lower than about 0.7 kg/L, are preferably sent back in a first composting cycle in accordance with step A. Indeed, it is possible that the intermediate wastes 19C could be formed by biodegradable wastes the degradation of which at the first composting cycle would be incomplete, or which would have not dried completely. Thus, this second substep C2 allows improving the separation between the wastes which will enter into the composition of the mixture of refined wastes 28, and the other wastes.

Preferably, the second substep C2 is performed after the substep C1, and contributes to the separation of the heavy wastes and the light wastes.

Advantageously, step C, the first substep C1 and the second substep C2 are performed at least by means of the aforementioned separation means, comprising in particular a ballistic belt separator 12C (as illustrated for example in FIGS. 7 and 8) and an associated densimetric table separator. In this instance, step E2 preferably implements a first ballistic belt 12A allowing separating at first a portion of heavy wastes 25, the remainder of the mixture of dried wastes 2 being directed towards a second ballistic belt 12B allowing separating a portion of light wastes 13C and a portion of undetermined wastes 15C. Advantageously, the portion of undetermined wastes is directed towards the densimetric separator, which allows separating the portion of undetermined wastes in a finer way, in particular by separating light wastes joining the portion of light wastes 13C, heavy wastes joining the portion of heavy wastes 25, and the portion of undetermined wastes 19C described hereinbefore.

Figure 7:
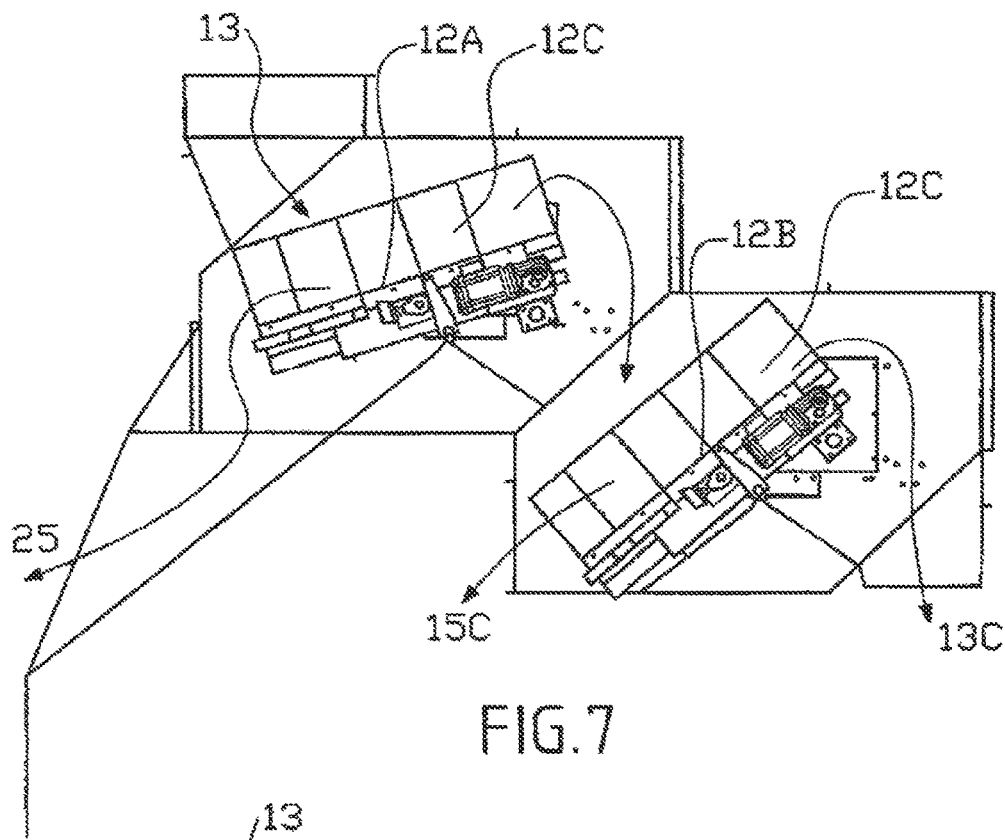
FIG. 7 illustrates, according to a side view, a longitudinal section of a separation means including a ballistic belt separator which may be used in the treatment method of FIG. 1, in particular during step E2.
Figure 8:
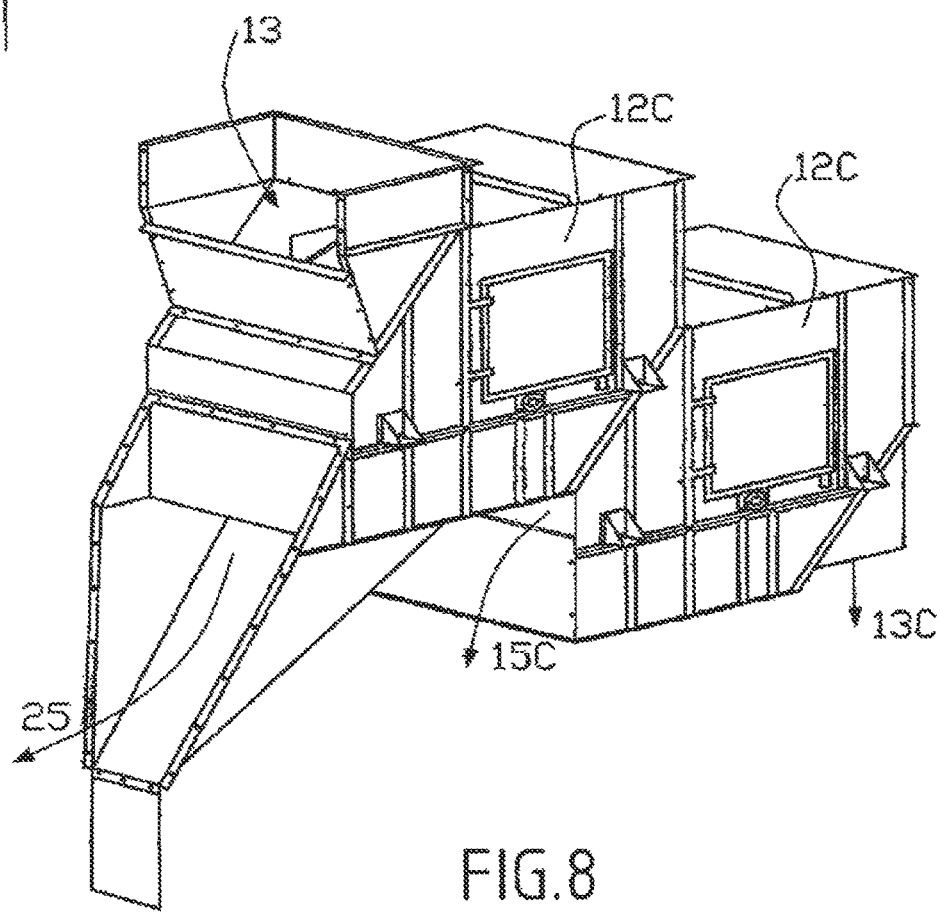
FIG. 8 represents, according to a perspective view, the separation means of FIG. 7.

As represented in FIGS. 7 and 8, the first and the second ballistic belts 12A, 12B are preferably included in the same machine, as illustrated in the figures, the first ballistic belt 12A directly supplying the second ballistic belt 12B by gravity. Advantageously, an accelerator belt may be placed upstream of the first ballistic belt 12A so as to accelerate the mixture of dried wastes 2 in order to project them on the first ballistic belt 12A with some kinetic energy so as to improve the separation of the wastes. Preferably, the first ballistic belt 12A and the second ballistic belt 12B present an inclination in the longitudinal direction, which inclination can be adjusted, for example between 20° and 70° with respect to the horizontal, in order to allow adjusting the separation of wastes. In order to improve the separation, the first and/or the second ballistic belt 12A, 12B preferably includes an elastic rolling strip allowing making some types of wastes rebound and roll on said rolling strip (in particular the heaviest ones), some other wastes being intended, on the contrary, to adhere to the rolling strip. Furthermore, the rolling strip may advantageously present adhesive or sticky properties, in particular in order to make the finest wastes adhere thereto. In particular, the mixture of dried wastes 2 comprises fines, which may advantageously be recovered in order to be introduced in the portion of light wastes 13C, for example by scraping said ballistic belts 12C by means of a tungsten-made scraper equipping said ballistic belts (not represented).

Upon completion of step C, in particular upon completion of substep C2, and prior to step D, step E2 preferably includes a step F during which a portion of coarse wastes 18C the size of which exceeds 12 mm, is separated from the portion of light wastes 13C, for example by means of a rotary trommel the mesh of which allows segregating objects the size of which is larger than about 12 mm, and objects the size of which is smaller than about 12 mm. In this case, the coarse wastes 18C form light wastes the size of which is too considerable to enter into the composition of the mixture of refined wastes 28, and in particular to form the compost complying with the standard NF U 44-051. Advantageously, all or part of this portion of coarse wastes 18C is crushed in order to be reintroduced in the portion of light wastes 13C during step D. Alternatively, all or part of this portion of coarse wastes 18C is preferably reintroduced in wastes undergoing step A. Furthermore, all or part of this portion of coarse wastes 18C, which may be formed by non-compostable wastes, may enter in the refuse-derived fuel production step X, or, if possible, undergo the recycling step W.

Finally, step D preferably allows refining the decomposition of the organic wastes contained in the initial first fraction of wastes 13. At this stage of step E2, the second composting cycle is performed on the portion of light wastes 13C, which come from the first fraction of wastes 13, which has been devoided from most of, still from all, the wastes undesirable in the formation of the final mixture of refined wastes 28. Thus, a high-quality mixture of refined wastes 28, likely to comply with particular standards, is obtained. Moreover, upon completion of step E2, the major portion of, still all, the biodegradable wastes of the first fraction of wastes 13 enter into the composition of the final mixture of refined wastes 28.

Preferably, step D is performed by placing the portion of light wastes 13C, for example in heaps, in at least one second composting bay 3C, for example similar to the first composting bay 3C.

Advantageously, step D comprises at least one substep D1 of re-humidifying the light wastes, for example with the moisture 6C recovered during the drying step B, in order to promote the natural composting, and in particular the maturation of the compost during the second composting cycle so as to from the mixture of refined wastes 28. Preferably, step D also comprises an aeration of the light wastes, for example in a similar way as step A (by means of an air flow, or several turnovers of the heap of light wastes) in order to promote the formation of refined wastes 28.

Preferably, step D may also comprise the reintroduction of micro-organisms in said light wastes, coming for example from the first composting cycle of step A.

Thus, it is possible to valorize the first fraction of wastes 13 into a final mixture of refined wastes 28, forming for example a compost in accordance with the standard NF U 44-051.

Advantageously, and as represented in FIG. 1, the treatment method includes a step W during which are recycled the non-biodegradable recyclable wastes 26, which have been separated beforehand from the first fraction of wastes 13 during step E2, and the recyclable wastes 26, which have been separated beforehand from the residual second fraction of wastes 14, for example during steps E4, E5 or E6. As described hereinbefore, during its progress, step E2 preferably allows extracting and separating recyclable wastes 26 from the first fraction of wastes 13, in the same manner as steps E4 to E6.

As represented in FIG. 1, the portion of heavy wastes 25 is added to the residual second fraction of wastes 14 upon completion of step E1, in order to undergo in particular step E4 and/or steps E5 and/or E6 described hereinbefore, to the extent that they advantageously comprise a major proportion of non-biodegradable recyclable wastes in comparison with the proportion of biodegradable wastes.

Advantageously, the treatment method further includes a step X during which a refuse-derived fuel production process is subjected to the wastes, preferably non-recyclable, which have been separated from the first fraction of wastes 13 during step E2 and which have been separated from the residual second fraction of wastes 14, for example during step E6. Advantageously, the recovered wastes, preferably non-recyclable and which cannot be valorized in the other sectors (recycling or production of compost), are substantially devoid of chlorinated elements, so that they can be used in the production of a refuse-derived fuel. Indeed, most of the chlorinated elements, for example the wastes containing PVC, have preferably been separated beforehand during the steps of the treatment method.

Advantageously, step X includes a substep of separating fines from the non-recyclable wastes, in order not to convert wastes devoid of fines into a refuse-derived fuel.

Advantageously, step X includes a substep of selecting wastes presenting a calorific value higher than a predetermined threshold, in order to produce a refuse-derived fuel the calorific value of which is particularly high.

Preferably, step X includes a substep during which elements with a high calorific value are added to the wastes of step X, said elements with a high calorific value being distinct from the wastes of the treatment method, in order to increase, or regulate the calorific value of the refuse-derived fuel.

Advantageously, step X includes a substep of adding common industrial wastes to the wastes of step X.

Preferably, the fines recovered from the wastes during the previously described steps may be either used in step E2 to produce a compost, or destroyed or buried.

In a general manner, the wastes which could not be recycled, transformed into a compost or into a refuse-derived fuel are preferably buried or incinerated.

The invention also concerns, as such, a plant for treating a mixture of wastes 2, the latter being with heterogeneous sizes, shapes and consistencies, a non-negligible portion of the mass of the mixture of wastes 2 being formed by biodegradable wastes, for example at least 10% of the mass, and a non-negligible portion of the mass of the mixture being formed by non-biodegradable recyclable wastes 26, for example at least 10% of the mass.

Preferably, the plant described hereinafter allows implementing the treatment method described hereinbefore, and preferably forms a facility for treating and sorting wastes.

The treatment plant of the invention comprises a rotary sorting machine 1, allowing separating the mixture of wastes 2 into a first fraction of wastes 13 and a residual second fraction of wastes 14, the size of the first fraction of wastes 13 being smaller than about 180 mm, preferably smaller than 140 mm.

Advantageously, the role of the sorting machine 1 is to organize the wastes of said mixture of wastes 2, by classifying and separating the contained wastes into categories based on their nature or their intrinsic characteristics. In this manner, the wastes sorted by the sorting machine 1 may advantageously undergo the treatments described hereinbefore, which would have not been possible to perform when said wastes are in the initial state of a mixture of wastes 2.

A non-exhaustive and non-limiting embodiment of a sorting machine 1 is represented in FIG. 4.

Advantageously, the sorting machine 1 comprises a first trommel section 3, provided with a first separation wall 5 extending over a first axial length L1 and being provided with a first series of separation through orifices 7, 8 allowing separating the mixture of wastes 2 into a first fraction of wastes 13 getting across said first separation wall 5 via the first series of separation orifices 7, 8 and into a residual second fraction of wastes 14, the mixture of wastes 2 being intended to circulate along said first wall so as to be separated.

The first trommel section 3 is designed to receive therein the mixture of wastes 2 in order to perform a first sorting of the latter. Preferably, said first trommel section 3 is intended to bring the mixture of wastes 2 into contact with the first separation wall 5. At contact with the latter, the mixture of wastes 2 is sieved, and/or filtered, said first separation wall 5 being porous, so as to enable the passage of the first fraction of wastes 13 therethrough, and to prevent the passage of the residual second fraction of wastes 14 therethrough. Preferably, the first fraction of wastes 13 is formed by wastes the average size of which is smaller than those of the residual second fraction of wastes 14.

The separation orifices 7, 8 of the first series of separation orifices 7, 8 are formed throughout the first separation wall 5, so as to make it porous, and are calibrated so as to let only the first fraction of wastes 13 pass therethrough, in the same manner as a sieve, the elements of which fraction are finer than those of the residual second fraction of wastes 14.

The mixture of wastes 2 is intended to evolve, for example by gravity, along the first separation wall 5 over the entire first length L1. Advantageously, the latter represents the porous length of the first separation wall 5, that is to say the effective length pierced by the first series of separation orifices 7, 8.

The first fraction of wastes 13 is discharged from the first trommel section 3, for example by gravity, in a first hopper 12 placed below the first trommel section 3. Advantageously, the residual second fraction of wastes 14 remains channeled within the first trommel section 3, and is brought to pass in the second trommel section 4.

To the extent that the mixture of wastes 2 first passes in the first trommel section 3, the latter preferably allows separating the wastes with the smallest size, the volumetric mass of which is the heaviest, the dynamic inertia of which is the highest, the most sticky, fat, dirty and moist wastes of the mixture of wastes 2. Thus, the first fraction of wastes 13 is advantageously formed mostly by wastes presenting such properties. In this instance, the first fraction of wastes 13 therefore concentrates mostly organic and/or biodegradable wastes, which present the aforementioned properties most of the time.

Preferably, as illustrated in FIGS. 4 and 5, the first series of separation orifices 7, 8 comprises at least primary orifices 7 at least contributing to the separation of the mixture of wastes 2 into the first fraction of wastes 13 and into the residual second fraction of wastes 14 by passage of the first fraction of wastes 13 throughout said primary orifices 7, the latter being with a size adapted to prevent the passage of wastes with a size larger than 80 mm. Thus, in this preferred case, only the sufficiently small-sized wastes are allowed to pass throughout the primary orifices 7, so as to form the first fraction of wastes 13. Preferably, the chosen size of the primary orifices 7 allows performing a high-quality selection of the biodegradable wastes, that is to say that it allows obtaining a high concentration of biodegradable wastes in the first fraction of wastes 13. To this end, the section of the primary orifices 7 is preferably circular, and with a diameter comprised between 85 mm and 95 mm, preferably about 90 mm. It should be noted that, in particular in order to adapt to the composition of the mixture of wastes 2, other sizes and shapes of primary orifices 7 may be considered without departing from the scope of the invention, for example a polygonal shape, an oblong shape, a smaller size, or a larger size.

Advantageously, the primary orifices 7 are evenly distributed, so as to form a meshing, over a major portion of the surface of the first separation wall 5.

Advantageously, and as illustrated in FIG. 4, the first series of separation orifices 7, 8 also comprises secondary orifices 8 contributing to the separation of the mixture of wastes 2 into the first fraction of wastes 13 and into the residual second fraction of wastes 14 by passage of the first fraction of wastes 13 throughout said secondary orifices 8, the latter having a size adapted to enable the passage of wastes the size of which is comprised between 1 times and 1.5 times the size of the wastes the passage of which is enabled by the primary orifices 7, the secondary orifices 8 being disposed upstream of the primary orifices 7 with regards to the flow direction of the mixture of wastes 2.

In contrast with common trommels, the first separation wall 5 advantageously presents a porosity decreasing along its first length L1, so that the mixture of wastes 2 is first brought into contact with the secondary orifices 8, and then with the primary orifices 7, the size of the secondary orifices 8 being larger than the size of the primary orifices 7. Preferably, the section of the secondary orifices 8 is circular, with a diameter comprised between 105 mm and 115 mm, preferably about 110 mm. It should be noted that, in particular in order to adapt to the composition of the mixture of wastes 2, other sizes and shapes of secondary orifices 8 may be considered without departing from the scope of the invention, for example a polygonal shape, an oblong shape, a smaller size, or a larger size.

Preferably, the secondary orifices 8 are evenly distributed, so as to form a meshing, over a minor portion of the surface of the first separation wall 5 which is unoccupied by the primary orifices 7. Advantageously, the secondary orifices 8 are distributed over about one eighth of the first length L1, the secondary orifices occupying substantially all the remaining length.

Distributed over such a short length, the secondary orifices 8 allow including to the first fraction of wastes 13 only a portion of wastes with a size larger than the size allowed by the primary orifices 7 and contained in the mixture of wastes 2. In a particularly advantageous manner, such a design allows ensuring that the residual second fraction of wastes 14 contains a lesser proportion, or still a substantially zero proportion, of biodegradable wastes, even though a more considerable portion of non-biodegradable wastes is likely to be introduced in the first fraction of wastes 13.

Preferably, the sorting machine 1 also comprises a second trommel section 4, provided with a second separation wall 6 extending over a second axial length L2, said second separation wall 6 being provided with a second series of separation through orifices 9 allowing separating the residual second fraction of wastes 14 into a subfraction of small-sized wastes 15 getting across said second separation wall 6 via said second series of separation orifices 9 and into a residual subfraction of large-sized wastes 16, the subfraction of large-sized wastes 16 being formed by wastes the size of which is larger than the subfraction of small-sized wastes 15, the residual second fraction of wastes 14 being intended to circulate along said second wall so as to be separated.

The second trommel section 4 is designed to receive therein the residual second fraction of wastes 14, coming from the first trommel section 3, so as to perform a second sorting of said residual second fraction of wastes 14. Preferably, the second trommel section 4 is intended to bring the residual second fraction of wastes 14 into contact with the second separation wall 6. At contact with the latter, the residual second fraction of wastes 14 is sieved, and/or filtered, said second separation wall 6 being porous, so as to enable the passage of the subfraction of small-sized wastes 15 therethrough, and to prevent the passage of the subfraction of large-sized wastes 16 therethrough.

The separation orifices 9 of the second series of separation orifices 9 are formed throughout the second separation wall 6, so as to make it porous, and are calibrated so as to let only the subfraction of small-sized wastes 15 pass therethrough, in the same manner as a sieve, the elements of which subfraction are finer than those of the subfraction of large-sized wastes 16.

The residual second fraction of wastes 14 is intended to evolve, for example by gravity, along the second separation wall 6 over the entire second length L2. Advantageously, the latter represents the porous length of the second separation wall 6, that is to say the effective length pierced by the second series of separation orifices 9.

As illustrated in FIG. 4, the subfraction of small-sized wastes 15 is discharged from the second trommel section 4, for example by gravity, in a second hopper 17 placed below the second trommel section 4. Preferably, the subfraction of large-sized wastes 16 remains channeled within the second trommel section 4 and is discharged from the latter. For this purpose, the second trommel section 4 preferably presents a discard output through which the subfraction of large-sized wastes 16 is intended to come out from said second trommel section 4. Advantageously, the discard output 21 opens into a discharge hopper 18 connected to the end of the second trommel section 4, and in which the subfraction of large-sized wastes 16 falls by gravity.

To the extent that the residual second fraction of wastes 14 is preferably substantially devoid of biodegradable wastes, dirty, sticky and/or with a high volumetric mass, which have been discarded by the first trommel section 3, the second trommel section 4 preferably allows performing a sorting of the wastes, including in particular recyclable wastes, present in the residual second fraction of wastes 14. In particular, it preferably allows isolating wastes with a relatively considerable size contained in the subfraction of large-sized wastes 16, which would undergo for example a manual sorting aiming to separate the biodegradable wastes, the recyclable wastes and the non-recyclable wastes. Advantageously, the smaller wastes contained in the subfraction of small-sized wastes 15 may in turn undergo for example an automated sorting aiming to separate the biodegradable wastes, the recyclable wastes and the non-recyclable wastes. In any case, the subsequent sortings performed on the subfraction of small-sized wastes 15 and on the subfraction of large-sized wastes 16 are advantageously facilitated, to the extent that, at this stage, the wastes are substantially cleared from the organic and/or biodegradable, sticky, dirty and foul wastes.

Preferably, the second series of separation orifices 9 comprises at least tertiary orifices 9 at least contributing to the separation of the residual second fraction of wastes 14 into the subfraction of small-sized wastes 15 and into the subfraction of large-sized wastes 16 by passage of the subfraction of small-sized wastes 15 throughout said tertiary orifices 9, the latter being with a size adapted to prevent the passage of wastes with a size larger than at least 200 mm, or still 300 mm. Thus, in this preferred case, only the sufficiently small-sized wastes are allowed to pass throughout the tertiary orifices 9, so as to form the subfraction of small-sized wastes 15. Preferably, the chosen size of the tertiary orifices 9 allows performing a selection of a predetermined type of recyclable wastes, that is to say that it allows obtaining a high concentration of this particular type of recyclable wastes in the subfraction of small-sized wastes 15. To do so, the section of the tertiary orifices 9 is advantageously oblong-shaped, and said oblong section presenting a small diameter Dp, and a large diameter Dg, as illustrated in particular in FIG. 6. Preferably, the expression «oblong section» includes for example a section shape which is rectangular or elliptical, or a shape combining the characteristics of the latter. Advantageously, the large diameter Dg and the small diameter Dp are chosen to as to correspond to types of wastes which are desired to be included in particular in the subfraction of small-sized wastes 15. For example, the mixture of wastes 2 being likely to contain plastic or glass bottles, generally with a thirty-centimeter standard size, it is possible to choose a large diameter Dg with a slightly larger size than the size of said bottles, that is to say slightly larger than thirty centimeters. Similarly, for example, the mixture of wastes 2 being likely to contain used newspapers, generally with a twenty-centimeter standard size, it is possible to choose a small diameter Dp with a slightly larger size than the size of said newspapers, that is to say slightly larger than twenty centimeters.

Consequently, for each tertiary orifice, the small diameter Dp is preferably comprised between 200 and 240 mm, preferably about 220 mm, the large diameter Dg being comprised between 300 and 400 mm, preferably about 330 mm, the small diameter Dp being substantially perpendicular to the large diameter Dg, as illustrated in particular in FIG. 6. Of course, in particular in order to adapt to the composition of the initial mixture of wastes 2, other sizes and shapes of tertiary orifices 9 may be considered without departing from the scope of the invention, for example a polygonal shape, a circular shape, a smaller size, or a larger size.

Advantageously, as illustrated in FIG. 6, the tertiary orifices 9 are distributed in successive rows along the second length L2, by alternating at least:
- a longitudinal row 19 of tertiary orifices 9, in which the large diameter Dg of the tertiary orifices 9 of the straight row is aligned in the direction of the second length L2, and
- a transverse row 20 of tertiary orifices 9, in which the small diameter Dp of the tertiary orifices 9 of the transverse row 20 is aligned in the direction of the second length L2.

Preferably, the large diameter Dg of the tertiary orifices 9 is parallel to the second longitudinal axis Y-Y' of the second trommel 4, as described below. On the contrary, the large diameter Dg of the tertiary orifices 9 is preferably perpendicular to the second longitudinal axis Y-Y'.

Thus, from one row to another, the tertiary orifices 9 are preferably substantially perpendicular to each other, so as to anticipate the orientation of the wastes to be included in the subfraction of small-sized wastes 15, and to improve the sorting effectiveness of the second trommel section 4

Preferably, the second series of separation orifices 9 will be formed by an alternation of longitudinal rows 19 and transverse rows 20 of tertiary orifices 9.

Of course, other arrangements of the tertiary orifices may be considered without departing from the scope of the invention.

Advantageously, the first series of separation orifices 7, 8 is distributed substantially over the entire first length L1 of the first trommel section 3, the second series of separation orifices 9 is distributed substantially over the entire second length L2 of the second trommel section 4, so as to be distributed over at least most of, or still the entire, surface formed by the first separation wall 5 and by the second separation wall 6. Such a design allows increasing the effective proportion of said separation walls, and therefore improving the compactness of the sorting machine 1 in a general manner.

According to a preferred feature, the second length L2 is smaller than the first length L1. Thus, the first trommel section 3, and in particular the second separation wall 5 has a length greater than the second trommel section 4, and in particular the second separation wall 6. Such a design allows the first trommel section 3 to effectively ensure the separation of most of, or still all, the biodegradable wastes initially contained in the mixture of wastes 2. Indeed, the first length L1 is advantageously chosen so as to be long enough so that all the wastes of the mixture of wastes 2 likely to get across the first separation wall 5 are effectively included in the first fraction of wastes 13.

Preferably, the first length L1 is at least 1.05 times the second length L2, preferably at least 1.10 times, still more preferably at least 1.12 times. Advantageously, the sum of the first length L1 and of the second length L2 is between 10 and 20 m. Preferably, the sorting machine 1 is designed to sort between 10 and 50 T/h of a mixture of wastes (2).

Preferably, as represented for example in FIG. 6, the first separation wall 5 presents a general shape of a prism, a cylinder or a truncated cone, the height of which forms a first longitudinal axis X-X' of the first separation wall 5, the latter being rotated around the first longitudinal axis X-X'.

Advantageously, the second separation wall 6 presents a general shape of a prism, a cylinder or a truncated cone, the height of which forms a second longitudinal axis Y-Y' of the second separation wall 6, the latter being rotated around the second longitudinal axis Y-Y'.

Preferably, the first longitudinal axis X-X' and/or the second longitudinal axis Y-Y' are slightly inclined with respect to the horizontal, so as to enable a progression, by gravity, of the wastes in the trommel sections along a predetermined flow direction, advantageously from the inlet 10, towards the second trommel section 4, to the discharge hopper 18 at the discard output of the second trommel section 4.

The rotation of the first trommel section 3 and/or the second trommel section 4 allows the wastes to be mixed and turned over, so that at least most of them, or still all of them, could enter into contact with the first separation wall 5 and/or the second separation wall 6 in order to be sorted.

For a better mixing of the wastes and to improve the sorting effectiveness of the sorting machine 1, each of the first trommel section 3 and/or the second trommel section 4 is designed to be rotated, the rotation being preferably performed in an alternating manner in one direction and in the other according to a desired frequency, around their respective longitudinal axes.

Advantageously, it is possible to choose a cylindrical shape, which allows the wastes, during the rotation of the trommel sections, to rub against each other so as to clean each other from the sticky wastes. Alternatively, it is possible, for example, to choose a prismatic shape with an octagonal base so as to make the wastes rebound on the walls, in order to enable a better separation of the wastes from each other.

Advantageously, the diameter of the first trommel section 3 and of the second trommel section 4 is comprised between 2 and 3 mm.

Consequently, as illustrated in FIG. 4, the first series of separation orifices 7, 8 is preferably distributed over the entire circumference of the first separation wall 5, the second series of separation orifices 9 being distributed over the entire circumference of the second separation wall 6.

Preferably, and as illustrated in the figures, the separation orifices 7, 8 of the first series of separation orifices 7, 8 are distributed over the first separation wall 5 according to a first random meshing, the separation orifices 9 of the second series of separation orifices 9 being distributed over the second separation wall 6 according to a second random meshing. In this manner, the separation orifices 7, 8, 9 are disposed both in a first helix and in a cross second helix, which improves the sorting effectiveness during the circulation of the wastes in the first trommel section 3 and in the second trommel section 4, regardless of the direction of rotation of said trommel section 3, 4.

Preferably, the first separation wall 5 and/or the second separation wall 6 is provided with vanes 22 for lifting the wastes circulating in the first trommel section 3 and/or in the second trommel section 4, respectively. Preferably, each of the lifting vanes 22 is disposed in the longitudinal direction of the trommel sections 3, 4 so as to drive, lift and stir the wastes during the rotation of said trommel sections 3, 4. Advantageously, the lifting vanes 22 are disposed randomly.

As illustrated in FIG. 4, the first trommel section 3 and the second trommel section 4 form one single one-piece trommel 3, 4 rotating around one single longitudinal axis X-X'-Y-Y', the output end of the first trommel section 3 being directly connected to the input end of the second trommel section 4. In this preferred case, the trommel section 3, 4 are integral with each other, and form one single drum.

In the preferred case represented in FIG. 4, the sorting machine 1 comprises three load bearings 23 allowing supporting and/or driving in rotation the unique trommel, two load bearings 23 being placed at the ends of the unique trommel, the latter being placed substantially medially between the two others. For example, the load bearings 23 correspond to bearings, and/or to drive means such as a gear wheel or a drive pulley. Advantageously, the medial load bearing 23 allows avoiding any risk of bending of the unique trommel 3, 4, in particular in the case where its total length is considerable and where the amount of wastes therein is particularly massive.

Alternatively, according to another preferred variant which is not represented in FIGS. 3 to 6, it is possible to consider that the first trommel section 3 and the second trommel section 4 form two independent trommels, the sorting machine 1 including means for transferring the residual second fraction of wastes 14 from the first trommel section 3 to the second trommel section 4.

Preferably, the first trommel section 3 comprises a transfer output for the residual second fraction of wastes 14, the second trommel section 4 comprising a secondary input for the residual second fraction of wastes 14. Advantageously, the secondary input is connected to the transfer output, so that the wastes could circulate from the first trommel section 3 to the second trommel section 4. Preferably, the sorting machine 1 is designed so that the residual second fraction of wastes 14 falls, by gravity, from the first trommel section 3 into the second trommel section 4.

For purely illustrative purposes, the variant represented in FIGS. 3 to 6 may operate in the manner described hereinafter.

The unique trommel 3, 4 rotating in an alternating manner in one direction and in the other around its longitudinal axis, the mixture of wastes 2 to be sorted is introduced via the inlet 10.

The mixture of wastes 2 first circulates in the first trommel section 3 so as to be separated:
  on the one hand, into a first fraction of wastes 13, which passes throughout the first separation wall 5 so as to fall in the first hopper 12, and
  on the other hand, into a residual second fraction of wastes 14, which remains inside the unique trommel 3, 4 and evolves in the direction of the second trommel section 4.

When reaching the second trommel section 4, the residual second fraction of wastes 14 is sorted again, and is separated in this instance:
  on the one hand, into a subfraction of small-sized wastes 15, which passes throughout the second separation wall 6 so as to fall in the second hopper 17, and
  on the other hand, into a subfraction of large-sized wastes 16, which is discharged from the second trommel section 4 by the discard hopper 21, so as to fall in the discharge hopper 18.

Thus, the fractions and subfractions of wastes 13, 15, 18 recovered separately in the hoppers 12, 17, 18 can be treated separately, despite the very large heterogeneity of the initial mixture of wastes 2.

According to the invention, the treatment plant also comprises a composting plant allowing subjecting the first fraction of wastes 13 to a composting process so as to compost, at least partially, the contained biodegradable wastes.

As illustrated in FIGS. 7 to 9, the composting plant preferably comprises:
  at least one first composting bay 3C allowing subjecting the first fraction of wastes 13 to a first composting cycle so as to compost, at least partially, the biodegradable wastes of said first fraction of wastes 13, and to obtain a mixture of pre-composted wastes 2,
  at least one bay 2C for drying the mixture of pre-composted wastes 2, allowing obtaining a mixture of dried wastes 2,
  means for separating the mixture of dried wastes 2 at least into a portion of heavy wastes 25 and a portion of light wastes 13C, the portion of heavy wastes 25 being substantially formed by wastes with a volumetric mass heavier than the wastes of the portion of light wastes 13C,
  at least one second composting bay 3C allowing subjecting the portion of light wastes 13C to a second composting cycle so as to compost, at least partially, the contained biodegradable wastes, and obtain a mixture of refined wastes 28.

Advantageously, the composting plant allows implementing the previously described step E2. Henceforth, the elements of this composting plant, and in particular the first composting bay 3C, the second composting bay 3C, the drying bay 2C, the separation means, advantageously correspond to those described hereinbefore.

Preferably, the first bay, and/or the second bay, comprise humidity sources 6C allowing humidifying the considered mixture of wastes 2, that is to say the first fraction of wastes 13 and the portion of light wastes 13C, respectively.

Advantageously, the drying bay 2C comprises a recuperator 100 of a portion of the moisture 6C contained in the mixture of pre-composted wastes 2 when drying the latter, the recuperator 100 allowing supplying the humidity sources 6C with the moisture 6C recovered when drying said pre-composted wastes.

Advantageously, the recuperator 100 corresponds to the recuperator described hereinbefore, and comprises for example a device for condensing the moisture 6C contained in the drying air, which has been extracted from the mixture of pre-composted wastes 2. For example, the recuperator 10C also comprises a device for draining the composting juices 110, disposed at the ground level 12D, allowing capturing and draining said composting juices 110.

Preferably, the drying bay 2C comprises means for making a drying air $A_{dry}$ circulate throughout the mixture of pre-composted wastes 2 so as to dry the latter, the circulation means including at least:
  means for blowing air 7C above the mixture of pre-composted wastes 2,
  means for sucking drying air 8C below the mixture of pre-composted wastes 2, disposed for example at the ground level 12D, under the heap of pre-composted wastes.

Advantageously, such an arrangement allows creating a flow of drying air $A_{dry}$ from top to the bottom so as to allow drying the mixture of pre-composted wastes 2.

Preferably, the condensation device is placed within the suction means 8C and/or the blowing means 7C.

Preferably, the drying bay 2C comprises a light source 5C as described hereinbefore, allowing irradiating the mixture of wastes 2 as it dries, and therefore facilitating its drying.

Advantageously, the composting bay 3C also comprises a light source 5A allowing irradiating the mixture of wastes 2 as it is composted, and therefore improve the composting of the latter (as illustrated in FIG. 9), the natural light, and in particular the solar rays, being favorable to the development of life, and in particular to the micro-organisms which are sensitive thereto.

Advantageously, the light source 5C may be formed by a glazing placed at the base of the composting 3C or drying 2C bay, letting the sun light pass through and protecting the bay from bad weather.

Advantageously, such an arrangement allows avoiding plugging of the circulation means.

Advantageously, the composting plant further comprises means for treating the drying air $A_{dry}$ having circulated throughout the mixture of pre-composted wastes 2 in order to clear it substantially from any composting emission, in particular any odorant emission, for example as described hereinbefore.

Preferably, the composting bays and the drying bays are identical, and/or coincident, so as to form composting/drying bays and ensure both associated functions selectively. Of course, the drying bays and the composting bays may be perfectly distinct from each other without departing from the scope of the invention.

As described hereinbefore, the separation means preferably include at least one ballistic table separator 12C and an associated densimetric table separator allowing separating the portion of heavy wastes 25 and the portion of light wastes 13C.

Advantageously, the plant includes means (not represented) for adding, to the residual second fraction of wastes 14, the portion of heavy wastes 25 separated by the separation means of the composting plant. For example, the addition means may be in the form of a conveyor designed to transport the portion of heavy wastes 25 in order to add it to the residual second fraction of wastes 14. Thus, the portion of heavy wastes 25 recovered from the first fraction of wastes 13 may advantageously be added to the residual second fraction of wastes 14 upon completion of step E1.

Preferably, the treatment plant comprises at least one automatic line for sorting the wastes of a subfraction of small-sized wastes 15 from the residual second fraction of wastes 14 (preferably associated to step E6), and at least one manual line for sorting a subfraction of large-sized wastes from the residual second fraction of wastes 14 (preferably associated to step E5), the subtraction of large-sized wastes being formed by wastes the size of which is larger than the subfraction of small-sized wastes (15), the sorting lines allowing separating recyclable wastes (26) from the residual second fraction of wastes (14), as well as non-recyclable wastes.

As described hereinbefore, the automatic sorting line preferably comprises a ballistic belt separator, an accelerator belt, a lower recovery means, an upper recovery means, a glass trap, a tungsten-made strip scraper, robots for sorting substantially flat wastes, robots for sorting substantially volume-shaped wastes, sets of conveyor belts.

Thanks to such a plant, all or part of the method described hereinbefore may preferably be performed in an automated and industrial manner.

Finally, the treatment plant preferably comprises a plant for producing a refuse-derived fuel from the non-recyclable wastes separated by means of the sorting lines, allowing performing in particular the previously described step X.

Preferably, thanks to such an invention, it is possible to recycle and valorize at least 80% of the mass of the initial mixture of wastes, preferably at least 90%.

POSSIBILITY OF INDUSTRIAL APPLICATION

The invention finds its industrial application in the design, the realization and the implementation of means for treating a mixture of wastes with heterogeneous sizes, shapes and consistencies, which mixture comprises biodegradable wastes and non-biodegradable recyclable wastes.

The invention claimed is:

1. A method for treating a mixture of wastes (2), the latter being with heterogeneous sizes, shapes and consistencies, a non-negligible portion of the mass of the mixture of wastes (2) being formed by biodegradable wastes and a non-negligible portion of the mass of the mixture being formed by non-biodegradable recyclable wastes (26) the treatment method being characterized in that it includes the following successive steps:
   Step E1 during which the mixture of wastes (2) is separated into a first fraction of wastes (13) the size of which is smaller than about 180 mm via a first series of separation orifices (7, 8) and into a residual second fraction of wastes (14), said first series of separation orifices (7, 8) comprising primary orifices (7) and secondary orifices (8) the size of which is larger than the size of the primary orifices (7) so that the mixture of wastes (2) is first brought into contact with the secondary orifices and then with the primary orifices (7),
   Step E2 during which the first fraction of wastes (13) is subjected to a composting process so as to compost, at least partially, the contained biodegradable wastes, the composting process including the following successive steps:
   Step A: the first fraction of wastes (13) is subjected to a first composting cycle so as to compost, at least partially, the biodegradable wastes of said first fraction of wastes (13), and to obtain a mixture of pre-composted wastes (2),
   Step B: the mixture of pre-composted wastes (2) is subjected to a drying so as to obtain a mixture of dried wastes (2),
   Step C: the mixture of dried wastes (2) is separated into at least one portion of heavy wastes (25) and one portion of light wastes (13C), the portion of heavy wastes (25) being formed by wastes with a volumetric mass heavier than the wastes of the portion of light wastes (13C),
   Step D: the portion of light wastes (13C) is subjected to a second composting cycle so as to compost, at least partially, the contained biodegradable wastes, and to obtain a mixture of refined wastes (28), in particular a compost.

2. The treatment method according to claim 1, characterized in that the secondary orifices (8) have a size adapted to enable the passage of wastes the size of which is comprised between 1 times and 1.5 times the size of the wastes the passage of which is enabled by the primary orifices (7).

3. The treatment method according to claim 1, characterized in that the wastes of the first fraction of wastes (13) have a size smaller than about 110 mm.

4. The treatment method according to claim 3, characterized in that at least 10% of the mass of the mixture is formed by biodegradable wastes, and at least 10% of the mass of the mixture is formed by non-biodegradable recyclable wastes (26).

5. The treatment method according to claim 1, characterized in that the mixture of wastes (2) is formed by domestic wastes, and/or by wastes of economic activities, said wastes not having undergone any prior sorting, or grinding.

6. The treatment method according to claim 1, characterized in that it includes:
   a step W during which is performed a recycling of the non-biodegradable recyclable wastes (26) which have been separated beforehand from the first fraction of wastes (13) during step E2 and the recyclable wastes (26) which have been separated beforehand from the residual second fraction of wastes (14), and
   a step X during which a refuse-derived fuel production process is subjected to the wastes which have been separated from the first fraction of wastes (13) during step E2 and which have been separated from the residual second fraction of wastes (14).

7. The treatment method according to claim 1, characterized in that the portion of heavy wastes (25) is added to the residual second fraction of wastes (14) upon completion of step E1.

8. The treatment method according to claim 1, characterized in that it includes, upon completion of step E1 and simultaneously with the latter, a step E4 of separating the residual second fraction of wastes (14) into a subfraction of large-sized wastes and a subfraction of small-sized wastes (15), the subfraction of large-sized wastes being formed by wastes the size of which is larger than the subfraction of small-sized wastes (15).

9. The treatment method according to claim 8, characterized in that the subfraction of large-sized wastes is formed by wastes the size of which is larger than about 330 mm, the subfraction of small-sized wastes (15) being formed by wastes the size of which is smaller than about 330 mm.

10. The treatment method according to claim 8, characterized in that it includes a step E5 of manual sorting of the subfraction of large-sized wastes, allowing separating recyclable wastes (26) contained therein and non-recyclable wastes (27) contained therein.

11. The treatment method according to claim 8, characterized in that it includes a step E6 of automated sorting of the subfraction of small-sized wastes (15), allowing separating recyclable wastes (26) contained therein and non-recyclable wastes (27) contained therein.

12. The treatment method according to claim 11, characterized in that step E6 includes a first substep E61 of separating metallic wastes (26A) contained in the subfraction of small-sized wastes (15) so as to separate at least most of the metallic wastes (26A) contained in said subfraction of small-sized wastes (15), the metallic wastes (26A) forming at least most of the recyclable wastes (26) contained in the small-sized wastes (15).

13. The treatment method according to claim 11, characterized in that step E6 includes a second substep E62 of separation of the subfraction of small-sized wastes (15) into a flow of substantially flat wastes and a flow of substantially volume-shaped wastes.

14. The treatment method according to claim 13, characterized in that step E6 includes a third substep E63 of robotized sorting of the flow of substantially flat wastes and of the flow of substantially volume-shaped wastes, so as to separate each of said flows of recyclable wastes (26) and non-recyclable wastes (27), the third substep E63 being performed upon completion of the second substep E62.

15. The treatment method according to claim 1, characterized in that, prior to step E1, the method comprises a step E7 of opening bags (24) in which bags (24) the mixture of wastes (2) is contained, in order to release said mixture of wastes (2) from said bags (24) so as to perform step E1.

16. A plant for treating a mixture of wastes (2), the latter being with heterogeneous sizes, shapes and consistencies, a non-negligible portion of the mass of the mixture of wastes (2) being formed by biodegradable wastes, and a non-negligible portion of the mass of the mixture being formed by non-biodegradable recyclable wastes (26), the treatment plant being characterized in that it comprises:
   a sorting machine (1), allowing separating the mixture of wastes (2) into a first fraction of wastes (13) the size of which is smaller than about 180 mm via a first series of separation orifices (7, 8), said first series of separation orifices (7, 8) comprising primary orifices (7) and secondary orifices (8) the size of which is larger than the size of the primary orifices (7) so that the mixture of wastes (2) is first brought into contact with the secondary orifices and then with the primary orifices (7), and into a residual second fraction of wastes (14),
   a composting plant allowing subjecting the first fraction of wastes (13) to a composting process so as to compost, at least partially, the contained biodegradable wastes;
   and wherein the sorting machine (1) comprises at least:
   a first trommel section (3), provided with a first separation wall (5) extending over a first axial length (L1) and being provided with a first series of separation through orifices (7, 8) allowing separating the mixture of wastes (2) into a first fraction of wastes (13) getting across said first separation wall (5) via the first series of separation orifices (7, 8) and into a residual second fraction of wastes (14) when the mixture of wastes (2) circulates along said first wall so as to be separated, and
   a second trommel section (4), provided with a second separation wall (6) extending over a second axial length (L2) smaller than the first length, said second separation wall (6) being provided with a second series of separation through orifices (9) allowing separating the residual second fraction of wastes (14) into a subtraction of small-sized wastes (15) getting across said second separation wall (6) via said second series of separation orifices (9) and into a residual subtraction of large-sized wastes (16), the subfraction of large-sized wastes (16) being formed by wastes the size of which is larger than the subfraction of small-sized wastes (15) when the residual second fraction of wastes (14) circulates along said second wall so as to be separated.

17. The treatment plant according to claim 16, characterized in that the secondary orifices (8) have a size adapted to enable the passage of wastes the size of which is comprised between 1 times and 1.5 times the size of the wastes the passage of which is enabled by the primary orifices (7), the secondary orifices (8) being disposed upstream of the primary orifices (7) with regards to the flow direction of the mixture of wastes (2).

18. The treatment plant according to claim 16, characterized in that it comprises at least one automatic line for sorting the wastes of a subfraction of small-sized wastes (15) from the residual second fraction of wastes (14), and at least one manual line for sorting a subfraction of large-sized wastes from the residual second fraction of wastes (14), the subtraction of large-sized wastes being formed by wastes the size of which is larger than the subfraction of small-sized wastes (15), the sorting lines allowing separating recyclable wastes (26) from the residual second fraction of wastes (14), as well as non-recyclable wastes.

19. The treatment plant according to claim 18, characterized in that it comprises a plant for producing a refuse-derived fuel from the non-recyclable wastes separated by means of the sorting lines.

20. A plant for treating mixture of wastes (2), the latter being with heterogeneous sizes, shapes and consistencies, a non-negligible portion of the mass of the mixture of wastes (2) being formed by biodegradable wastes, and a non-negligible portion of the mass of the mixture being formed by non-biodegradable recyclable wastes (26), the treatment plant being characterized in that it comprises:
　a sorting machine (1), allowing separating the mixture of wastes (2) into a first fraction of wastes (13) the size of which is smaller than about 180 mm via a first series of separation orifices (7, 8), said first series of separation orifices (7, 8) comprising primary orifices (7) and secondary orifices (8) the size of which is larger than the size of the primary orifices (7) so that the mixture of wastes (2) is first brought into contact with the secondary orifices and then with the primary orifices (7), and into a residual second fraction of wastes (14),
　a composting plant allowing subjecting the first fraction of wastes (13) to a composting process so as to compost, at least partially, the contained biodegradable wastes, characterized in that the composting plant comprises:
　at least one first composting bay (3C) allowing subjecting the first fraction of wastes (13) to a first composting cycle so as to compost, at least partially, the biodegradable wastes of said first fraction of wastes (13), and to obtain a mixture of pre-composted wastes (2),
　at least one bay (2C) for drying the mixture of pre-composted wastes (2), allowing obtaining a mixture of dried wastes (2),
　means for separating the mixture of dried wastes (2) at least into a portion of heavy wastes (25) and a portion of light wastes, the portion of heavy wastes (25) being substantially formed by wastes with a volumetric mass heavier than the wastes of the portion of light wastes,
　at least one second composting bay (3C) allowing subjecting the portion of light wastes to a second composting cycle so as to compost, at least partially, the contained biodegradable wastes, and obtain a mixture of refined wastes (28).

21. The treatment plant according to claim 20, characterized in that it includes means for adding, to the residual second fraction of wastes (14), the portion of heavy wastes (25) separated by the separation means of the composting plant.

* * * * *

UNITED STATES PATENT AND TRADEMARK OFFICE
CERTIFICATE OF CORRECTION

| | | |
|---|---|---|
| PATENT NO. | : 10,427,988 B2 | Page 1 of 1 |
| APPLICATION NO. | : 15/313425 | |
| DATED | : October 1, 2019 | |
| INVENTOR(S) | : Fabien Michel Alain Charreyre | |

It is certified that error appears in the above-identified patent and that said Letters Patent is hereby corrected as shown below:

On the Title Page

Please remove the Assignee: "FINANCE DEVELOPMENT ENVIRONNEMENT CHARREYRE-FIDEC" and replace with "FINANCE DEVELOPPEMENT ENVIRONNEMENT CHARREYRE-FIDEC"

Signed and Sealed this
Twenty-eighth Day of April, 2020

Andrei Iancu
*Director of the United States Patent and Trademark Office*